(12) United States Patent
Jackson

(10) Patent No.: US 7,356,770 B1
(45) Date of Patent: Apr. 8, 2008

(54) SYSTEM AND METHOD OF GRAPHICALLY MANAGING AND MONITORING A COMPUTE ENVIRONMENT

(75) Inventor: David Brian Jackson, Spanish Fork, UT (US)

(73) Assignee: Cluster Resources, Inc., Provo, UT (US)

( * ) Notice: Subject to any disclaimer, the term of this patent is extended or adjusted under 35 U.S.C. 154(b) by 366 days.

(21) Appl. No.: 11/268,857

(22) Filed: Nov. 8, 2005

Related U.S. Application Data

(60) Provisional application No. 60/625,894, filed on Nov. 8, 2004.

(51) Int. Cl.
*G06F 15/177* (2006.01)

(52) U.S. Cl. .................. 715/736; 715/735; 715/969

(58) Field of Classification Search ............. 718/104; 715/738, 736, 963, 965, 966, 969, 771, 772; 709/223, 224

See application file for complete search history.

(56) References Cited

U.S. PATENT DOCUMENTS

| | | | | |
|---|---|---|---|---|
| 5,550,970 A | * | 8/1996 | Cline et al. ................. | 715/772 |
| 6,076,174 A | * | 6/2000 | Freund ........................ | 714/47 |
| 6,330,008 B1 | * | 12/2001 | Razdow et al. ............. | 715/772 |
| 6,590,587 B1 | * | 7/2003 | Wichelman et al. ........ | 715/736 |
| 6,690,400 B1 | * | 2/2004 | Moayyad et al. ........... | 715/779 |
| 6,938,256 B2 | * | 8/2005 | Deng et al. ................. | 718/104 |
| 6,966,033 B1 | * | 11/2005 | Gasser et al. ............... | 715/738 |
| 7,168,049 B2 | * | 1/2007 | Day ........................... | 715/835 |
| 7,236,915 B2 | * | 6/2007 | Algieri et al. ............... | 703/13 |

(Continued)

OTHER PUBLICATIONS

Brad Stone, Julie Symons, UNIX Fault Management: A Guide for System Administration, Dec. 1, 1999, ISBN 0-13-026525-X, http://www.informit.com/content/images/013026525X/samplechapter/013026525.pdf.*

(Continued)

*Primary Examiner*—Weilun Lo
*Assistant Examiner*—John M Heffington
(74) *Attorney, Agent, or Firm*—Thomas M. Issacson

(57) ABSTRACT

Presented is a graphical interface for managing at least reservations and jobs within a compute environment such as a cluster or a grid. A user can graphically view reservations and jobs in the environment and interact with the interface to modify and create reservations with a view of the current status of the resources, available resources and graphically see how proposed changes, additions or modifications of reservations would affect the environment. The invention may comprise a graphical user interface, a computing device for operating the graphical user interface, a computer-readable medium storing instructions for controlling a computing device to utilize the run the graphical interface, and methods of interacting with the user through the graphical user interface. Disclosed are various graphical windows that present in different ways past resource consumption, a current time and future resource predicted usage based on at least one of jobs running and reservations. The interface also includes a window that shows user credentials and dependencies between users, administrators and policies.

34 Claims, 19 Drawing Sheets

U.S. PATENT DOCUMENTS

| | | | |
|---|---|---|---|
| 2003/0028645 A1* | 2/2003 | Romagnoli | 709/226 |
| 2003/0061262 A1* | 3/2003 | Hahn et al. | 709/104 |
| 2003/0135621 A1* | 7/2003 | Romagnoli | 709/226 |
| 2003/0158884 A1* | 8/2003 | Alford, Jr. | 709/104 |
| 2003/0185229 A1* | 10/2003 | Shachar et al. | 370/460 |
| 2003/0200109 A1* | 10/2003 | Honda et al. | 705/1 |
| 2004/0064817 A1* | 4/2004 | Shibayama et al. | 718/104 |
| 2004/0117768 A1* | 6/2004 | Chang et al. | 717/125 |
| 2004/0196308 A1* | 10/2004 | Blomquist | 345/734 |
| 2004/0236852 A1* | 11/2004 | Birkestrand et al. | 709/226 |
| 2005/0071843 A1* | 3/2005 | Guo et al. | 718/101 |

OTHER PUBLICATIONS

IBM Tivoli Workload Scheduler Job Scheduling Console User's Guide Feature Level 1.2 (Maintenance Release Oct. 2003), Oct. 2003, IBM Corporation, http://publib.boulder.ibm.com/tividd/td/TWS/SH19-4552-01/en_US/PDF/jsc_user.pdf.*

* cited by examiner

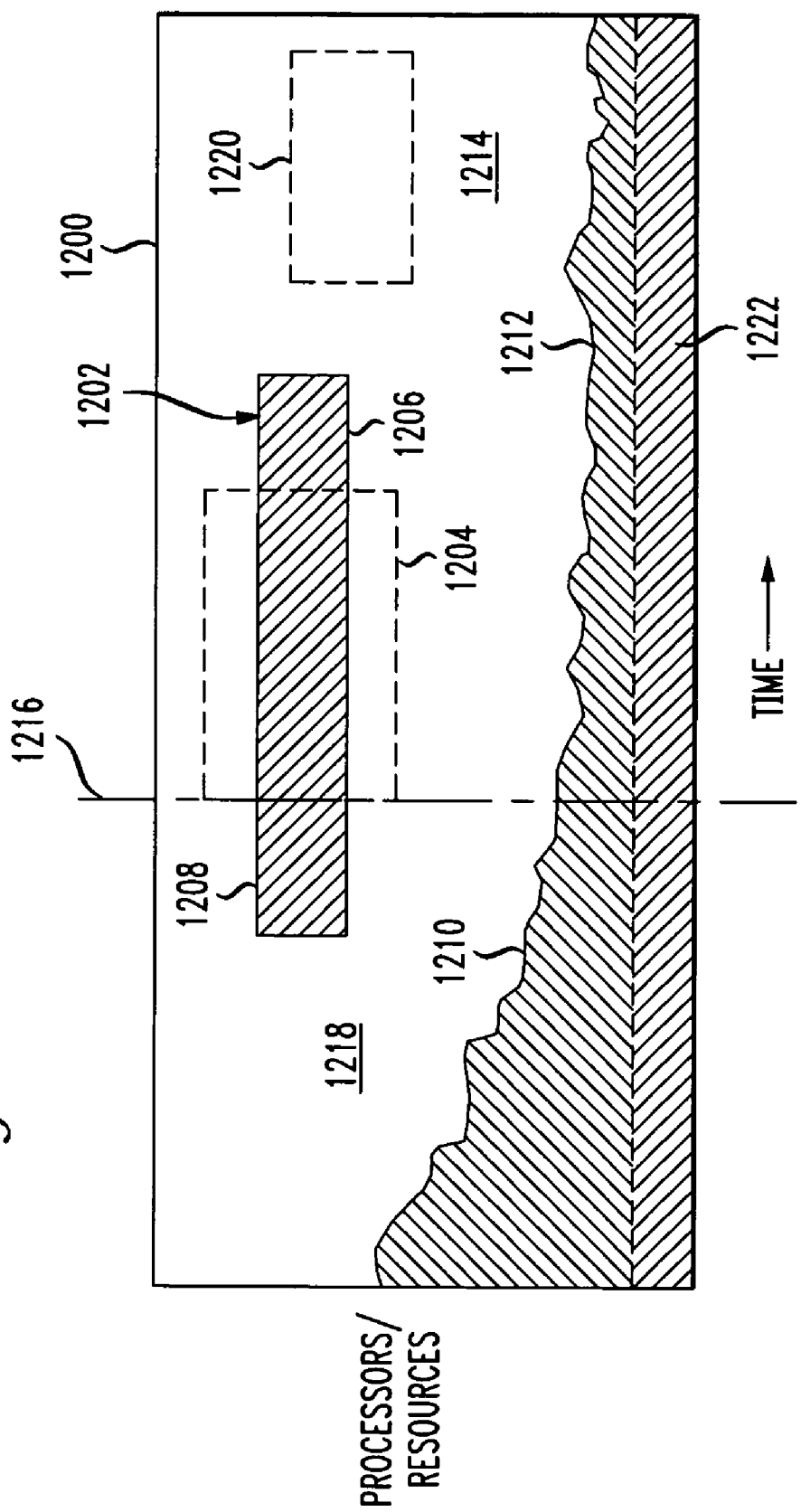

*FIG. 16*  1600

| Custom Report – Print Preview | | | | |
|---|---|---|---|---|
| File Navigation Zoom Help | | | | |

Account-User Friday November 12 2004 Credit Report

Administration      13 Items

| | Total Credits | Used Credits | Charge Rate | Total Cost |
|---|---|---|---|---|
| amadsen | 1,914,480 | 20,000,000 | $1.00 | $1,914,480.00 |
| awok | 4,908,840 | 20,000,000 | $1.00 | $4,908,840.00 |
| cjackson | 1,693,320 | 20,000,000 | $1.00 | $1,693,320.00 |
| drahman | 1,081,320 | 20,000,000 | $1.00 | $1,081,320.00 |
| gwolsey | 11,688,300 | 20,000,000 | $1.00 | $11,688,300.00 |
| jsmith | 1,069,020 | 20,000,000 | $1.00 | $1,069,020.00 |
| lwelch | 4,859,280 | 20,000,000 | $1.00 | $4,859,280.00 |
| mbentley | 1,784,700 | 20,000,000 | $1.00 | $1,784,700.00 |
| npeters | 3,148,860 | 20,000,000 | $1.00 | $3,148,860.00 |
| reynolds | 922,740 | 20,000,000 | $1.00 | $922,740.00 |
| roberts | 1,383,320 | 20,000,000 | $1.00 | $1,383,320.00 |
| wcarroll | 3,373,320 | 20,000,000 | $1.00 | $3,373,320.00 |
| Total | 42,792,060 | 260,000,000 | – | $42,792,060.00 |
| Average | 3,291,987.00 | 20,000,000.00 | $1.00 | $3,291,987.00 |

Engineering      13 Items

| | Total Credits | Used Credits | Charge Rate | Total Cost |
|---|---|---|---|---|
| aacker | 6,966,780 | 200,000,000 | $1.00 | $6,966,780.00 |
| allendr | 14,888,640 | 200,000,000 | $1.00 | $14,888,640.00 |
| anmitage | 6,010,020 | 200,000,000 | $1.00 | $6,010,020.00 |
| gastor | 4,513,920 | 200,000,000 | $1.00 | $4,513,920.00 |
| jbburton | 10,590,000 | 200,000,000 | $1.00 | $10,590,000.00 |
| jvelh | 18,862,620 | 200,000,000 | $1.00 | $18,862,620.00 |
| jzuflet | 916,500 | 200,000,000 | $1.00 | $916,500.00 |
| ralsop | 3,211,380 | 200,000,000 | $1.00 | $3,211,380.00 |
| sautois | 922,740 | 200,000,000 | $1.00 | $922,740.00 |
| tamaker | 31,837,620 | 200,000,000 | $1.00 | $31,837,620.00 |
| wcarroll | 3,373,320 | 200,000,000 | $1.00 | $3,373,320.00 |

Page 1

SYSTEM AND METHOD OF GRAPHICALLY MANAGING AND MONITORING A COMPUTE ENVIRONMENT

PRIORITY CLAIM

The present application claims priority to U.S. Provisional Application No. 60/625,894, Filed Nov. 8, 2004, the contents of which are incorporated herein by reference.

BACKGROUND OF THE INVENTION

1. Field of the Invention

The present invention relates to a compute resource management system and more specifically to a system and method of managing and monitoring resources within a compute environment such as a cluster and/or grid environment.

2. Introduction

Managers of compute environments such as clusters or grids desire maximum return on investment often meaning high system utilization and the ability to deliver various qualities of service to various users and groups. A cluster is typically defined as a parallel computer that is constructed of commodity components and runs as its system software commodity software. A cluster contains nodes each containing one or more processors, memory that is shared by all of the processors in the respective node and additional peripheral devices such as storage disks that are connected by a network that allows data to move between nodes. A cluster is one example of a compute environment. Other examples include a grid, which is loosely defined as a group of clusters, and a computer farm which is another organization of computer for processing.

General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. In general, a grid will comprise a plurality of clusters as will be shown in FIG. 1A. Several general challenges exist when attempting to maximize resources in a grid. First, there are typically multiple layers of grid and cluster schedulers. A grid 100 generally comprises a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which may refer to either the cluster schedulers 104 or the resource managers 106) are closer to the specific resources 108 and may not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult.

The managers of such clusters need to understand how the available resources are being delivered to the various users over time and need the ability to have the administrators tune 'cycle delivery' to satisfy the current site mission objectives.

How well a scheduler succeeds can only be determined if various metrics are established and a means to measure these metrics are available. While statistics are important, their value is limited unless optimal statistical values are also known for the current environment including workload, resources, and policies. If one could determine that a site's typical workload obtained an average queue time of 3 hours on a particular system, this would be a good statistic. However, if one knew that through proper tuning, the system could deliver an average queue time of 1.2 hours with minimal negative side effects, this would be valuable knowledge. Viewing and getting access to the multitude of statistics that are available in the management of a compute environment can be daunting. Accordingly, what is needed in the art is a way to improve an administrator's ability to tune jobs and reservations and other management of a compute environment.

SUMMARY OF THE INVENTION

The present invention was developed to address these issues. At its core, it is a tool designed to truly manage compute environment resources and provide meaningful information about what is actually happening on the system. The graphical interface disclosed herein was created to satisfy real-world needs of a system administrator as well as users of the system as they balance the needs of users, staff, and managers and interface with the compute environment workload management software.

The basic feature of the invention is a graphical interface for managing reservations and jobs on compute resources. For example, the invention enables one to graphically view reservations and jobs in the environment and to graphically modify and create reservations with a view of the current status of the resources and available resources. This simplifies the process of managing the compute environment. The invention may comprise a graphical user interface, a computing device for operating the graphical user interface, a computer-readable medium storing instructions for controlling a computing device to utilize the run the graphical interface, and methods of interacting with the user through the graphical user interface.

One embodiment comprises a computer-implemented graphical user interface for managing resources within a compute environment. The graphical user interface includes a presentation of a plurality of nodes within a compute environment wherein visual queues provide information about a status of each of the plurality of nodes, a presentation of node display options and a presentation of a key for matching the visual queues with their status meaning. The options may comprise at least display node state, display current usage, display historical usage and no display. Visual queues such as colors or particular patterns may be used to illustrate the differences in features. From such an interface, a user may more easily provide multi-modal input such as through the graphical interface to request node-based modifications such as online or offline requests of the selected node, popup or query the selected node, modify or provision the selected node and reserve the selected node.

Another embodiment relates to a computer-implemented graphical user interface for managing compute resources within a compute environment, the interface comprising a presentation of a window having a plurality of nodes on a first axis and a calendar (or any time based value) on a second axis and a presentation of selectable options within the window, the selectable options including at least current time, reservations, jobs and empty space, wherein the window presents consumed compute resources in a past time and user-selected options in a future time. The interface enables a user to provide input for a reservation utilizing empty space within the window via a method such as a right mouse click or a drag and drop method where the white space may be used to create or select and modify a reservation on compute resources. One aspect of the invention enables the user to select a reservation from a visual reservation screen and import that particular reservation into a different graphical window such as a processor usage window.

This ability enables the user to view change the processor usage based on proposed changes to the reservation. For example, if the user were to double the processors reserved for the reservation, what would happen to the compute environment if that reservation were committed? In this manner, the user can view graphically his proposed changes before they are committed.

These changes may also include a proposed change in cost to commit the reservation. For example, the user may dialog with the system over the cost to increase the number of processors for a reservation. If the use by other users of the compute environment is low, then the system may negotiate a small charge for increasing or modifying the reservation outside of the bounds or credential previously set by the user. If the other usage of the environment is large, then the cost may be greater for the user to request an increase in processors. This example and other kinds of interaction can take place with the user via a graphical interface.

The graphical user interface enables, upon selection of a reservation by a user, the interface to present at least one of the following options for modification of the reservation: cancel the reservation, query for information about the reservation, modify attributes associated with the reservation, modify a timeframe associated with the reservation and modify an allocation of resources associated with the reservation.

Another embodiment of the invention comprises an interface including a presentation of a window having resources a first axis and time on a second axis and a presentation a current time, consumed resources in a past time and reserved resources in a future time, a presentation of a reservation selected by a user for modification within available resource space and a module configured to receive modifications of the reservation from the user and to present changes to the resources in the future time according to the modifications.

The graphical user interface may engage in a dialog with the user to confirm creation of the reservation or to negotiate over cost or other parameters associated with a proposed change or modification to a reservation. Modifications to the reservation may be at least one of: start time, end time, duration and resource allocation quantity. One feature of this aspect of the invention is that the proposed changes the user attempts to make are automatically bounded by user credentials and as mentioned above, to go outside of these boundaries the system may engage in a dialog with the user.

Yet another embodiment of the invention relates to a computer-implemented graphical user interface for managing resources within a compute environment. The graphical user interface comprises a presentation of a plurality of credential relationships between entities associated with a compute environment, the plurality of credential relationships comprising at least relationships between users, administrators and usage criteria and a module configured to interact with a user modify and/or create credential. This graphical presentation of credential relationship and dependencies can enhance the ability of an administrator to manage the users of a compute environment.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 12 illustrates a graphical presentation of consumed and reserved resources;

FIG. 16 illustrates a charging and credit interface; and

DETAILED DESCRIPTION OF THE INVENTION

Figure 1:
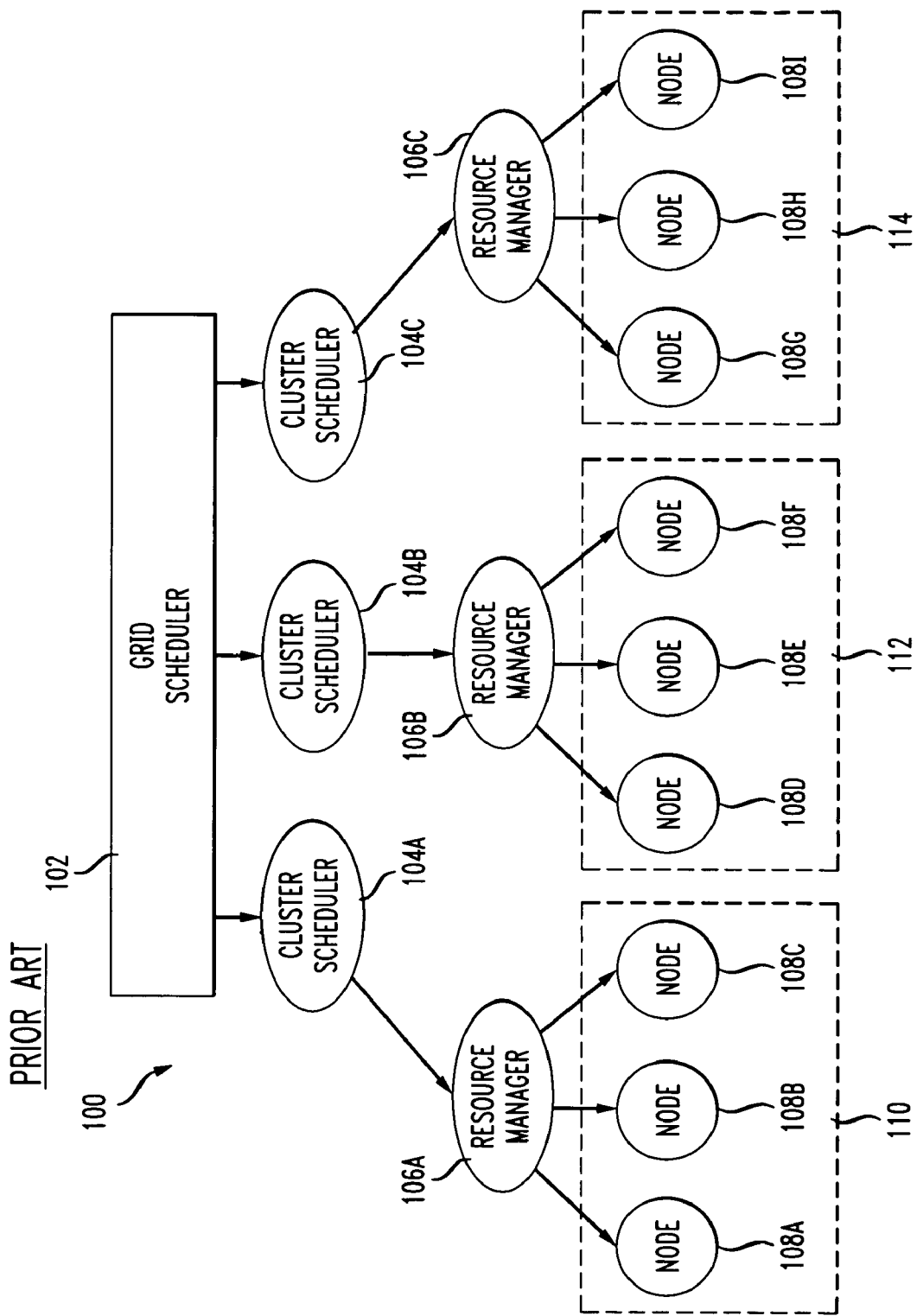
FIG. 1 illustrates generally a grid scheduler, cluster scheduler, and resource managers interacting with compute nodes within plurality of clusters.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention relates to reservations of resources within the context of a compute environment. One example of a compute environment is a cluster. The cluster may be, for example, a group of computing devices operated by a hosting facility, a hosting center, a virtual hosting center, a data center, grid and/or utility-based computing environments. Every reservation consists of three major components: a set of resources, a timeframe, and an access control list (ACL). Additionally, a reservation may also have a number of optional attributes controlling its behavior and interaction with other aspects of scheduling. A reservation's ACL specific which jobs can use the reservation. Only jobs which meet one or more of a reservation's access criteria are allowed to use the reserved resources during the reservation timeframe. The reservation access criteria comprises, in one example, at least following: users, groups, accounts, classes, quality of service (QOS) and job duration. A job may be any venue or end of consumption of resource for any broad purpose, whether it be for a batch system, direct volume access or other service provisioning.

A workload manager, or scheduler, will govern access to the compute environment by receiving requests for reservations of resources and creating reservations for processing jobs. A workload manager functions by manipulating five primary, elementary objects. These are jobs, nodes, reservations, QOS structures, and policies. In addition to these, multiple minor elementary objects and composite objects are also utilized. These objects are also defined in a scheduling dictionary.

A workload manager may operate on a single computing device or multiple computing devices to manage the workload of a compute environment. The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiments of the invention have any specific hardware components and any known or future developed hardware configurations are contemplated as within the scope of the invention when the computing device operates as is claimed.

Job information is provided to the workload manager scheduler from a resource manager such as Loadleveler, the Portable Batch System (PBS), Wiki or Platform's LSF products. Those of skill in the art will be familiar with each of these software products and their variations. Job attributes include ownership of the job, job state, amount and type of resources required by the job, required criteria (I need this job finished in 1 hour), preferred criteria (I would like this job to complete in ½ hour) and a wallclock limit, indicating how long the resources are required. A job consists of one or more requirements each of which requests a number of resources of a given type. For example, a job may consist of two requirements, the first asking for '1 IBM node with at least 512 MB of RAM' and the second asking for '24 IBM nodes with at least 128 MB of RAM'. Each requirement consists of one or more tasks where a task is defined as the minimal independent unit of resources. A task is a collection of elementary resources which must be allocated together within a single node. For example, a task may consist of one processor, 512 MB or memory, a 2 GB of local disk. A task may also be just a single processor. In symmetric multiprocessor (SMP) environments, however, users may wish to tie one or more processors together with a certain amount of memory and/or other resources. A key aspect of a task is that the resources associated with the task must be allocated as an atomic unit; without spanning node boundaries. A task requesting 2 processors cannot be satisfied by allocating 2 uni-processor nodes, nor can a task requesting 1 processor and 1 GB of memory be satisfied by allocating 1 processor on one node and memory on another.

A job requirement (or req) consists of a request for a single type of resources. Each requirement consists of the following components: (1) a task definition is a specification of the elementary resources which compose an individual task; (2) resource constraints provide a specification of conditions which must be met in order for resource matching to occur. Only resources from nodes which meet all resource constraints may be allocated to the job requirement; (3) a task count relates to the number of task instances required by the requirement; (4) a task List is a list of nodes on which the task instances have been located; and (5) requirement statistics tracking resource utilization.

As far as the workload manager is concerned, a node is a collection of resources with a particular set of associated attributes. In most cases, it fits nicely with the canonical world view of a node such as a PC cluster node or an SP node. In these cases, a node is defined as one or more CPU's, memory, and possibly other compute resources such as local disk, swap, network adapters, software licenses, etc. Additionally, this node will described by various attributes such as an architecture type or operating system. Nodes range in size from small uni-processor PC's to large SMP systems where a single node may consist of hundreds of CPU's and massive amounts of memory.

Information about nodes is provided to the scheduler chiefly by the resource manager. Attributes include node state, configured and available resources (i.e., processors, memory, swap, etc.), run classes supported, etc.

Figure 2:
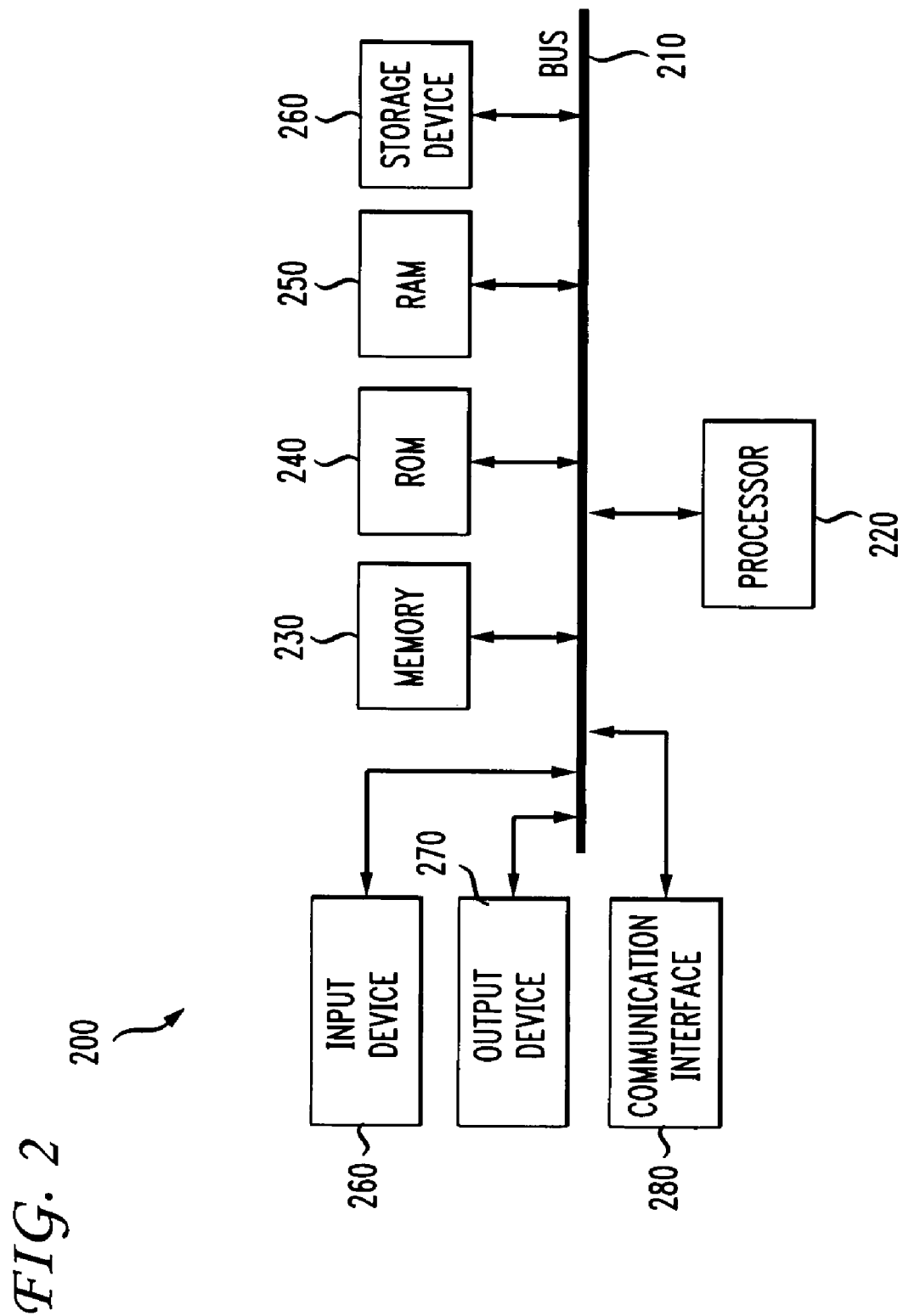
FIG. 2 illustrates a basic system aspect of the invention.

With reference to FIG. 2, an exemplary system for implementing the invention includes a general-purpose computing device 200, including a processing unit (CPU) 220, a system memory 230, and a system bus 210 that couples various system components including the system memory 230 to the processing unit 220. It can be appreciated that the invention may operate on a computing device with more than one CPU 220 or on a group or cluster of computing devices networked together to provide greater processing capability. The system bus 210 may be any of several types of bus structures including a memory bus or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer readable media provide nonvolatile storage of computer readable instructions, data structures, program modules configured to perform particular steps or functions and other data for the computing device 200. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media including storage media and communication media. Storage media is media which can store data t hat are accessible by a computer, such as magnetic cassettes, flash memory cards, digital versatile disks, cartridges, random access memories (RAMs), and read only memories (ROM) and the like. Communication media includes a cable or wireless signal containing a bit stream and the like. Both storage media and communications media may also be used in the exemplary operating environment.

To enable user interaction with the computing device 200, an input device 260 represents any number of input mechanisms, such as a microphone for speech, a touch-sensitive screen for gesture or graphical input, keyboard, mouse, motion input, speech and so forth. The input may be used by the user to indicate the beginning of a speech search query. The device output 270 can also be one or more of a number of output means. Wherein a presenter display 272 and audience display 274 are convenient, they may be used. Further, other presenter displays may be utilized as well. For example, if the invention is used in a conference setting where multiple people may each need an individual presenter view. Multimodal systems such as the invention enable a user to provide multiple types of input to communicate with the computing device 200. The communications interface 280 generally governs and manages the user input and system output.

We now turn to the various graphical features associated with management of compute resources such as a cluster or grid. These various interface may be programmed and utilized in cluster management software such as, for example, Cluster Resources, Inc. MOAB® software. The following figures illustrate example windows that provide a graphical interface to various aspects of managing a cluster or a grid of compute resources. The various aspects of the invention are illustrated with the Moab workload manager but may be applicable to any manager of multiple-node compute environments. The software typically runs on a computer server or some computing device and interacts with resource manages (such as, e.g., TORQUE, OpenPBS, and the like) to manage reservations of resources within a compute environment and submit jobs for processing on the compute environment. Those of skill in the art are familiar with a resource manager and its functionality.

The figures that follow are not meant to be the only way in which the graphical interface may be arranged. There are a number of different ways in which use of compute resources may be graphically managed and manipulated or altered. The figures provide ways of giving a user input into current usage of the resources, and a view both of the past, present and future use or scheduled/reserved use of the resources. One of the advantages of this approach is to simplify a very complicated process of managing the compute resources. An administrator or use can visually and graphically view, make, change and alter jobs, reservations, resources and so forth graphically whereas only a command line or simply field input was previously possible.

Underlying each of these presented windows is sophisticated analysis of many parameters associated with the compute environment and those users and groups who have access to (according to their individual or group credentials) use the resources. The invention provides a novel and useful way to graphically present this data as well as receive dynamic changes graphically from a user. The source code which is incorporated herein by reference via the parent provisional application provides an example methodology for implementing these graphical interface. However, it will be understood that those of skill in the art will have knowledge of the basic programming languages necessary to create these interfaces.

Figure 3:
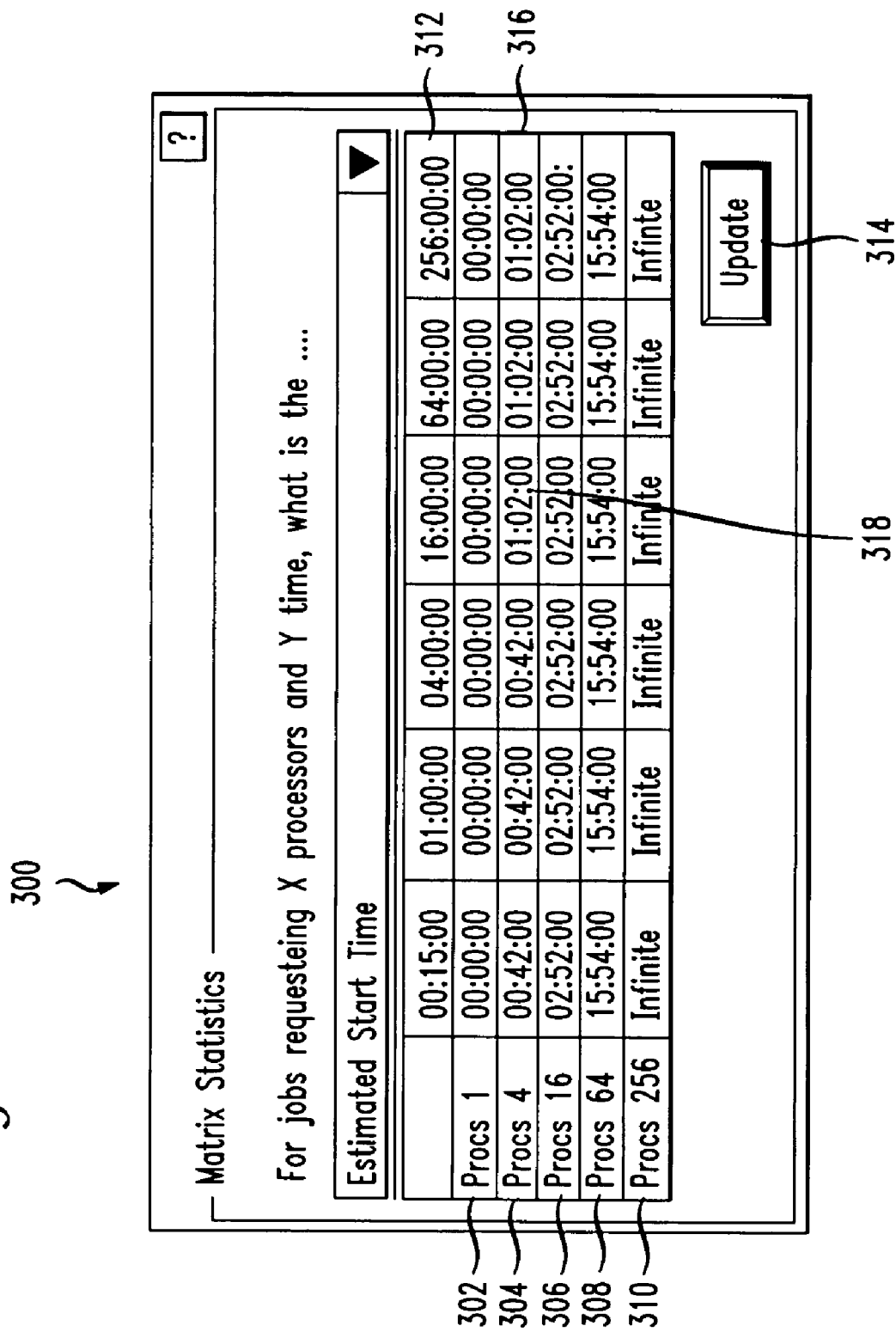
FIG. 3 illustrates a start time matrix graphical interface.

FIG. 3 illustrates a graphical user interface 300 for a cluster/grid or compute environment manager component breakdown and an estimated start time matrix. This window 300 provides a user with an estimated start time in a table that also presents different start and processing times for different groupings of processors. Matrix statistical window 300 shows across the top of the matrix 312 the time required for the job or it can mean time in the future when the job may start. Example times in row 312 include 15 minutes, one hour and up to 256 hours. The left column illustrates the processors (302, 304, 306, 308, 310) that can be requested to process jobs. For example, a single processor 302, or groups of 4, 16, 64 or 256 processors may be selected. The data that represents the results 316 are shown in the center of the table and illustrate how long it would take before a request using that processor could be fulfilled. The data "infinite" in the bottom row means that the request could never be fulfilled. An update button 314 is available to gather new and current data.

A purpose of the graphical interface is to allow users to make intelligent choices when submitting jobs. The window 300 may be selected by a user or requestor. As an example,, if the user wants to submit a job to the compute environment, the user could find out that if the job were to use 16 processors (306), and the job would take 15 minutes (312) to complete, then the job could begin to process in the compute environment in 2 hours and 52 minutes. Another example is for a job that would require 4 processors (304) and would take 16 hours to run (312), then the matrix informs the requestor that the job could begin in 1 hour and 2 minutes 318. The information in the matrix takes into account many factors such as other jobs, other reservations of resources, perhaps user or group criteria and policies, and so forth.

Accordingly, a user having the ability to utilize the graphical interface of FIG. 3 can identify an estimated start time for a job by receiving matrix statistics via the window 300. If a user has a job that he desires to process, and interacts with the window 300 to determine how many processors would be needed to get a job done in a certain amount of time, the user can receive that information from window 300. At that point, the user may also via one click or some other series of steps to submit the job. For example, if the user decides that the cell in the table where he wants to be is using four processors 304 such that the job starts in 16 hours 312 and will take one hour and two minutes 318, the user can click on that cell to submit that job. Or a "right click" capability may enable the user to place the curser over the desired cell and right click to receive options regarding whether to submit that job with the timing parameters of that cell.

Figure 4:
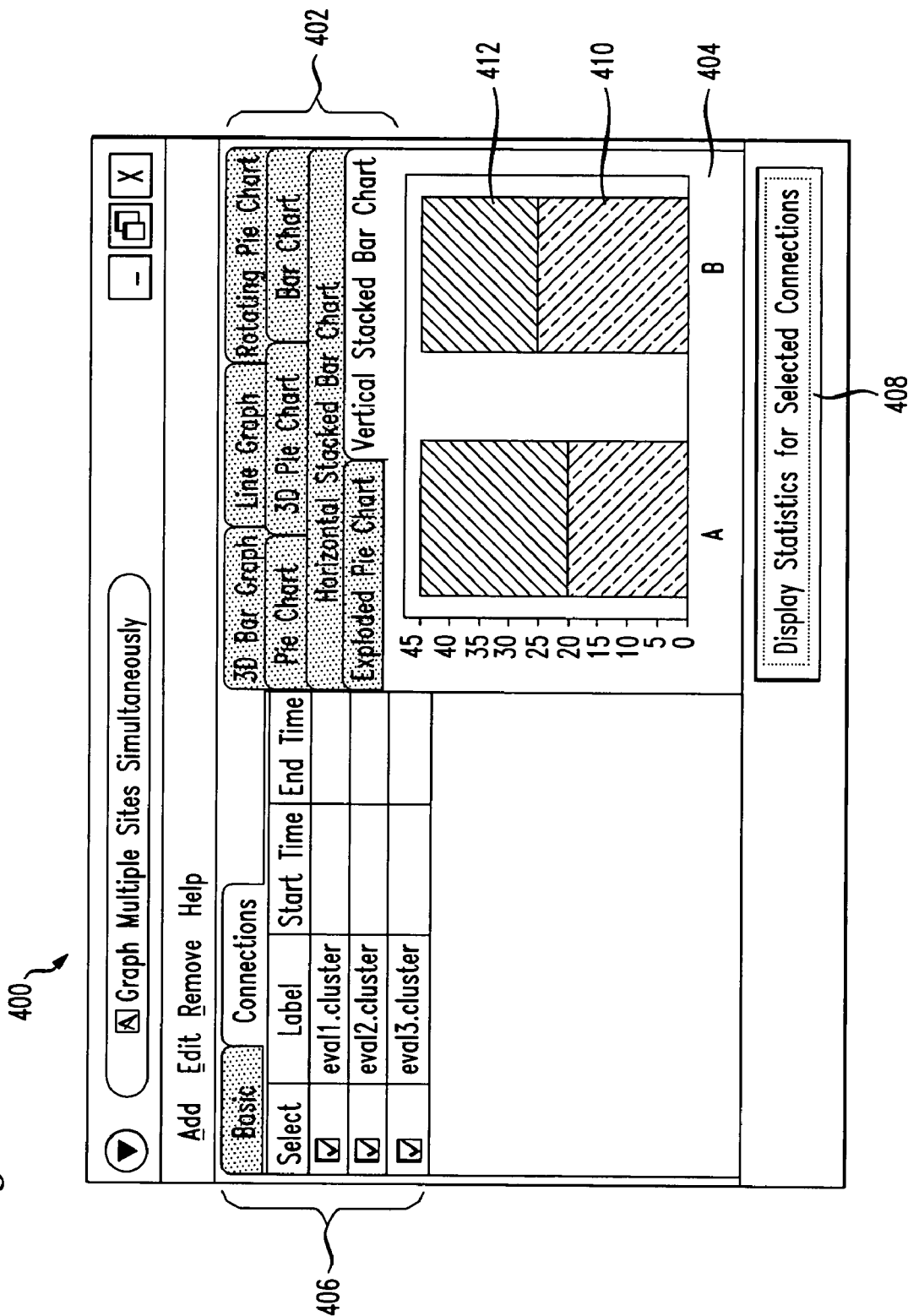
FIG. 4 illustrates a graphical interface enabling a user to view multiple clusters simultaneously.

FIG. 4 illustrates a window 400 that shows graphically information about multiple clusters simultaneously. This window provides the user with a graphical view of the status of multiple clusters simultaneously. Within a cluster or compute environment, it is advantageous for a user or an administrator to have a graphical view of resource status. Window 400 includes several features such as tables to allow a basic view and a connections view 406 that includes selected clusters, their labels, start times and end times. Another series of tabs 402 enable the user to view via various types of graph (bar charts, 3D graphs, line graphics, rotating pie charts, pie charts, 3D pie charts, horizontal stacked bar charts, exploded pie charts and/or vertical stacked bar charts. Other graphical presentations may also be selected.

FIG. 4 illustrates a screen shot of one of the clusters selected on the left side 406 and the graph style on the right side. This graphical interface allows a person to view a plurality of graphical means the states of multiple clusters. For example, eval1, eval2 and eval3 clusters are shown as selected 406. The vertical bar chart shown 404 illustrates a comparison of parameters associated with clusters eval1 and eval2 so that one can compare any statistic (processors used, resources reserved, group/user usage statistics, etc.) among a plurality of clusters. For example, one statistic 410 may be processors used and another statistic 412 may be group usage statistics. A button 408 enables the user to display the statistics for the selected connections or clusters. In connection with this interface is an interface or tab that enables a user to select the groupings of statistics to show on the chart 404.

Figure 5:
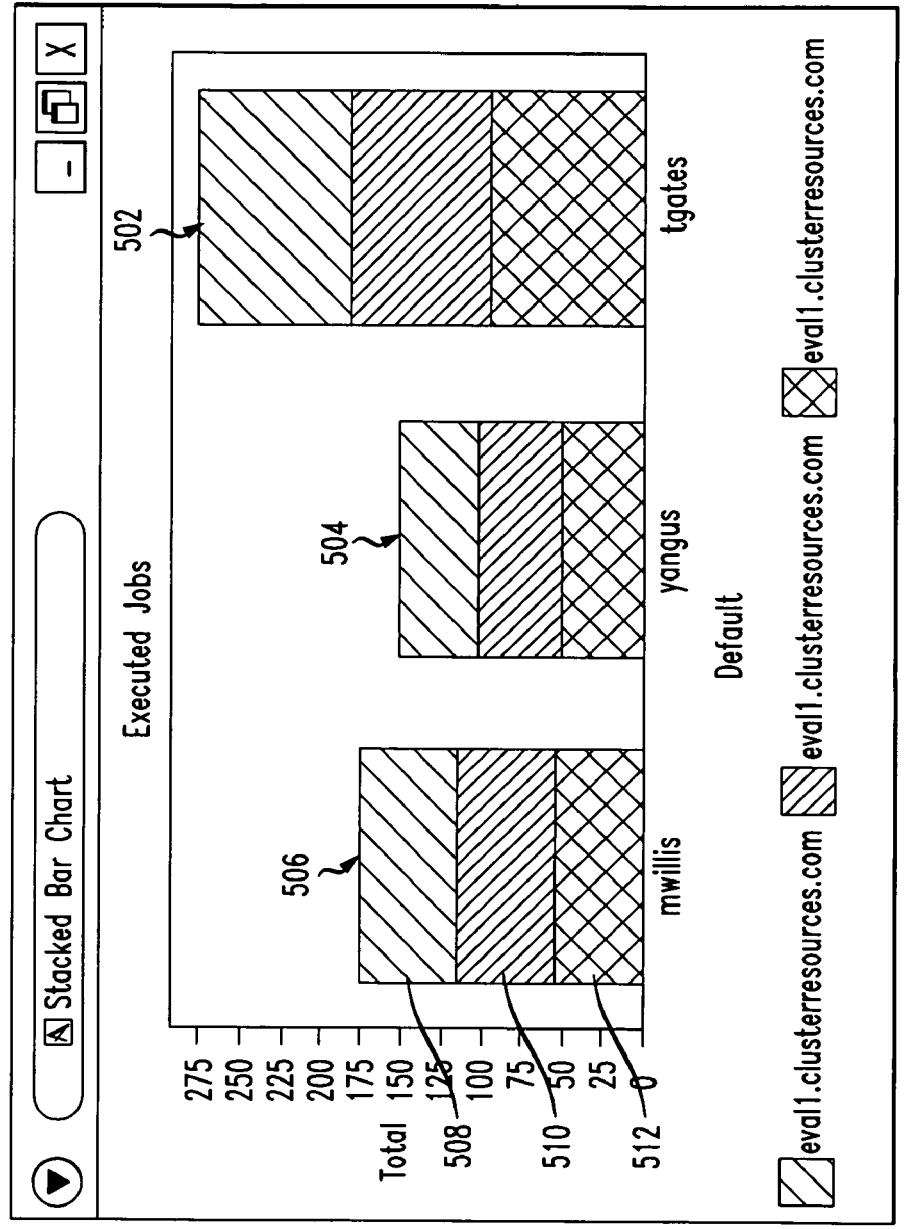
FIG. 5 illustrates a graphical interface showing a comparison of multiple cluster statistics.

FIG. 5 illustrates a stacked bar chart 500 for a comparison of cluster eval1, eval2 and eval3 executing jobs. This window 500 compares three users/groups (mwillis 506, yangus 504 and tgates 502. The different fields 508, 510, 512 in each part of the graph illustrate for each particular user their usage of multiple clusters. The graphical presentation of multiple cluster statistics can be very helpful to identify trends and usage information. For example, if the statistics relate to a particular user, the interface can allow an administrator to identify that one user has submitted many jobs on different clusters beyond their limits. Whereas, without a multiple cluster view, the administrator would have no mechanism to identify such practices.

Figure 6A:
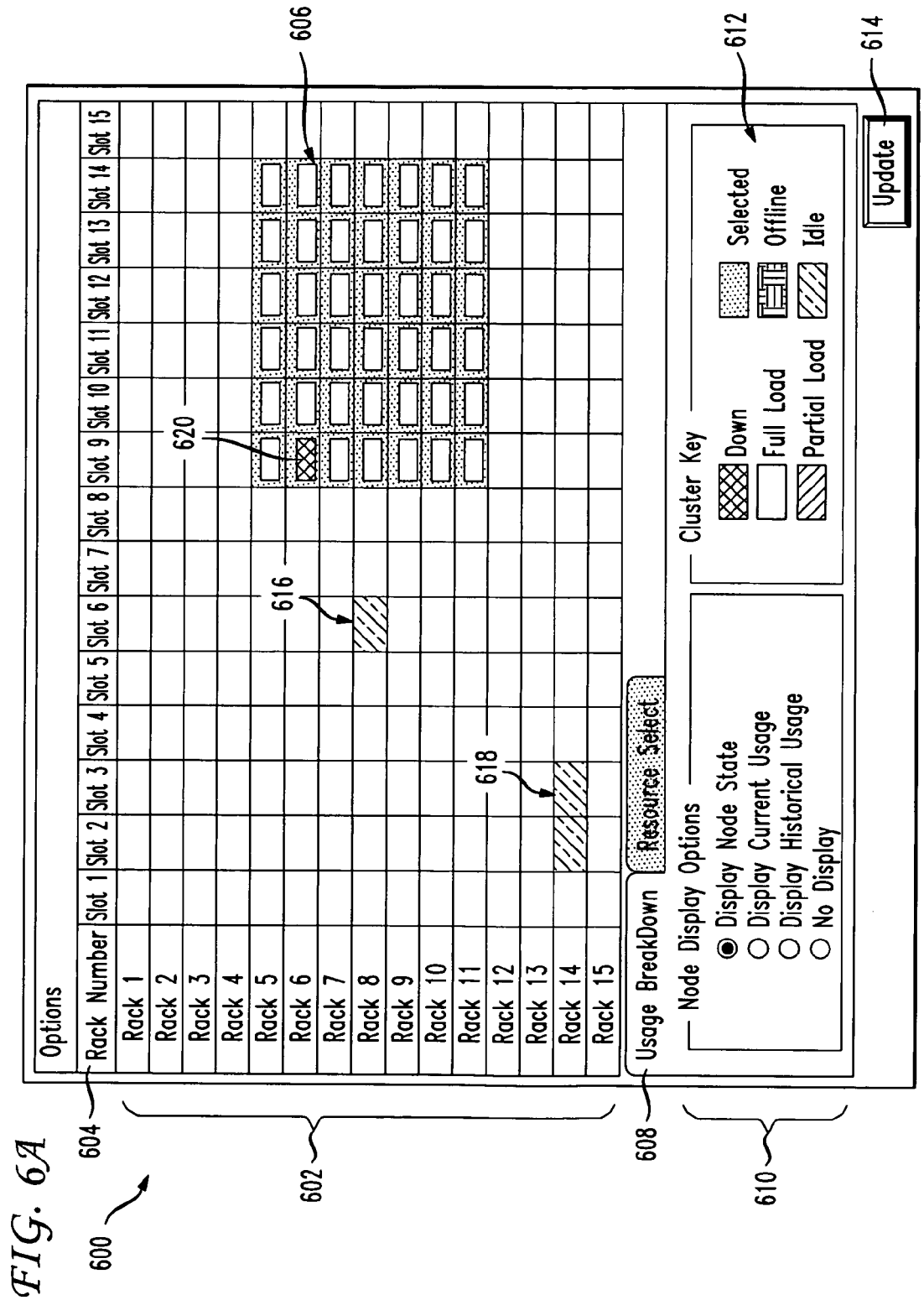
FIGS. 6A and 6B illustrate a graphical presentation of compute resource usage and status.
Figure 6B:
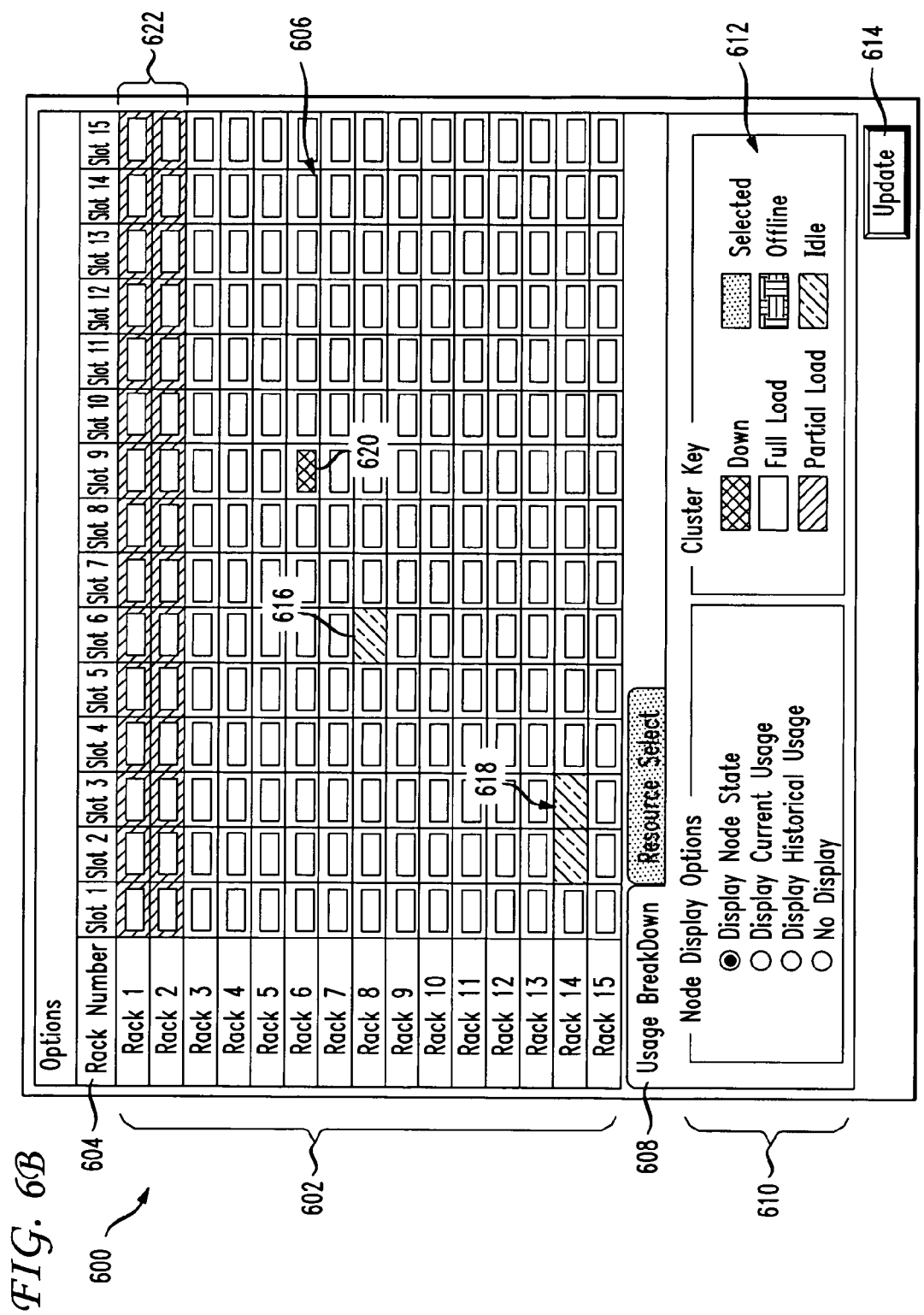

FIGS. 6A and 6B illustrate a visual look at a cluster. Window 600 shows an axis or a row 604 listing a rack number for a cluster and the slots in the rack. The center grouping of cells represents the nodes that make up the entire cluster. These may be computers, processors etc. within the slot. The racks are listed 602 in the left column or left axis. These are interchangeable and do not have to be on the vertical or horizontal axis as shown. Tabs 608 are provided to switch between modes of interaction with the graphical interface between usage breakdown and resource select. Node display options 610 include at least display node stats, display current usage, display historical usage, and no display. Options 610 enable a user to visually section up the cluster and view by applying different parameters.

A cluster key box 612 shows the color code for use in identifying the status or other parameter for each slot. The choices include at least down, full load, partial load, selected, offline and idle. An update button 614 enables the user to update the selection. The nodes shown include an example of idle nodes 618, 616, selected nodes in a group 606 and a down node 620. Using the graphical interface of FIG. 6A or 6B, a user may quickly analyze the nodes, make appropriate changes to the nodes and optimize the system. For example, the user may see that node 620 is down and immediately be able to make changes to workload or other decisions with working nodes. Changes may be made using such techniques as "right-clicking" on a node and receiving a menu of options to make modifications. The programming modules that manage the interfaces will receive at least one type of user input to identify or select a node and receive the indications of the modifications the user desires to make. Any means of selecting and modifying a node may be used from the vantage point of the visual interfaces of FIGS. 6A and 6B.

FIG. 6B illustrate similar features to FIG. 6A including the idle nodes 618, 616 and the down node 620. This interface allows the user to quickly analyze the nodes, make appropriate changes to the nodes, and optimize the system. The bottom bar allows you to visually section up the cluster. FIG. 6A illustrates the cluster broken down according to whether it is running, idle, or down, the FIG. 6B illustrates the cluster being highlighted 622 according to operating system (or any other parameters) on the node.

Figure 7:
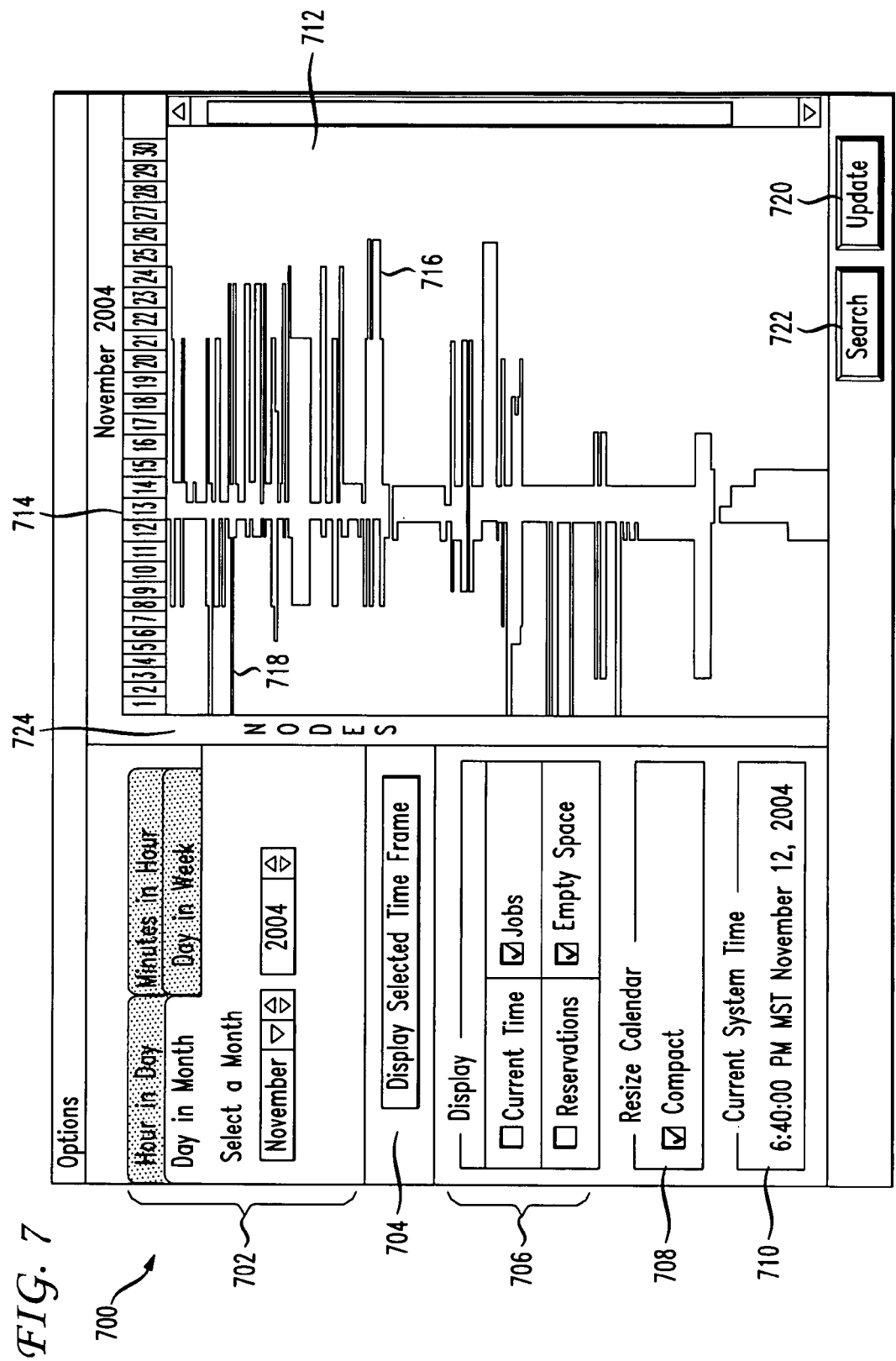
FIG. 7 illustrates a visual node calendar.

FIG. 7 illustrates a visual node calendar 700 which allows administrators to section the compute environment quickly according to space. In the window 700, days are across the top 714 and nodes are along the left 724. Options include date/time selection 702 which enable the user to select days in a month, hours in a week, minutes and an hour, hours in a day, etc. Window 700 shows the jobs and reservations 716 on the nodes 724. In window 700, only jobs are displayed. The user can create new reservation on nodes by highlighted empty space 712. This may be done in any manner, such as via a right click or double click, touch sensitive screen and so forth. Other features include an option to display the selected time frame 704, display data include current time, reservations, jobs and empty space 706. These parameters are user selectable. The user may be able to resize or compact down the calendar 708 and view the current system time 710.

One Purpose of interface 700 is to allow administrators to section off parts of their cluster quickly according to space. The current time in this example is November 12. This interface 700 highlights current time, reservations of resources, jobs and empty space. The white space 712 represents unused or unreserved resources. On the left side of the current time, the graph represents consumed resources (see, e.g., resources 718). On the right side of the current time, the graph represents reserved resources to continue to allow the job to process as is shown by 716.

In other words, the current time under November 12 (714) shows current jobs running on nodes. The horizontal bars to the left (e.g., 718) of November $12^{th}$ are resources that were consumed by the job and the horizontal bars to the right of November 12 (e.g., 716) illustrate reserved resources to continue to process the jobs.

Alternatively, the display options may simply show the current time, reservations if checked, jobs if checked, and empty space if checked in interface 716. In the example of FIG. 7, only jobs and empty space are checked in 716 and therefore the graphs shows only jobs. Where various features are checked such as reservations and jobs, the various features may be presented in different colors to highlight their differences.

The users can graphical drag and drop and manipulate jobs within window 700. For example, the user may want to move reservation/job 716 to another node, the user can graphically do that with interface 700 via a right click or click and hold or any other method to drag that reservation/job to a new location or modify it. One alternate as well allows the user to create a reservation within this space graphically. White empty space 712, that represents unused or unreserved resources, may be highlighted and a graphical reservations window can be presented (for example via a right-click) to complete this process. Programming modules are configured as part of the graphical interface to manage the receipt of user input and processing that input to move or modify jobs, create reservations, or take any other compute-resource management step that is available to the user.

Figure 8:
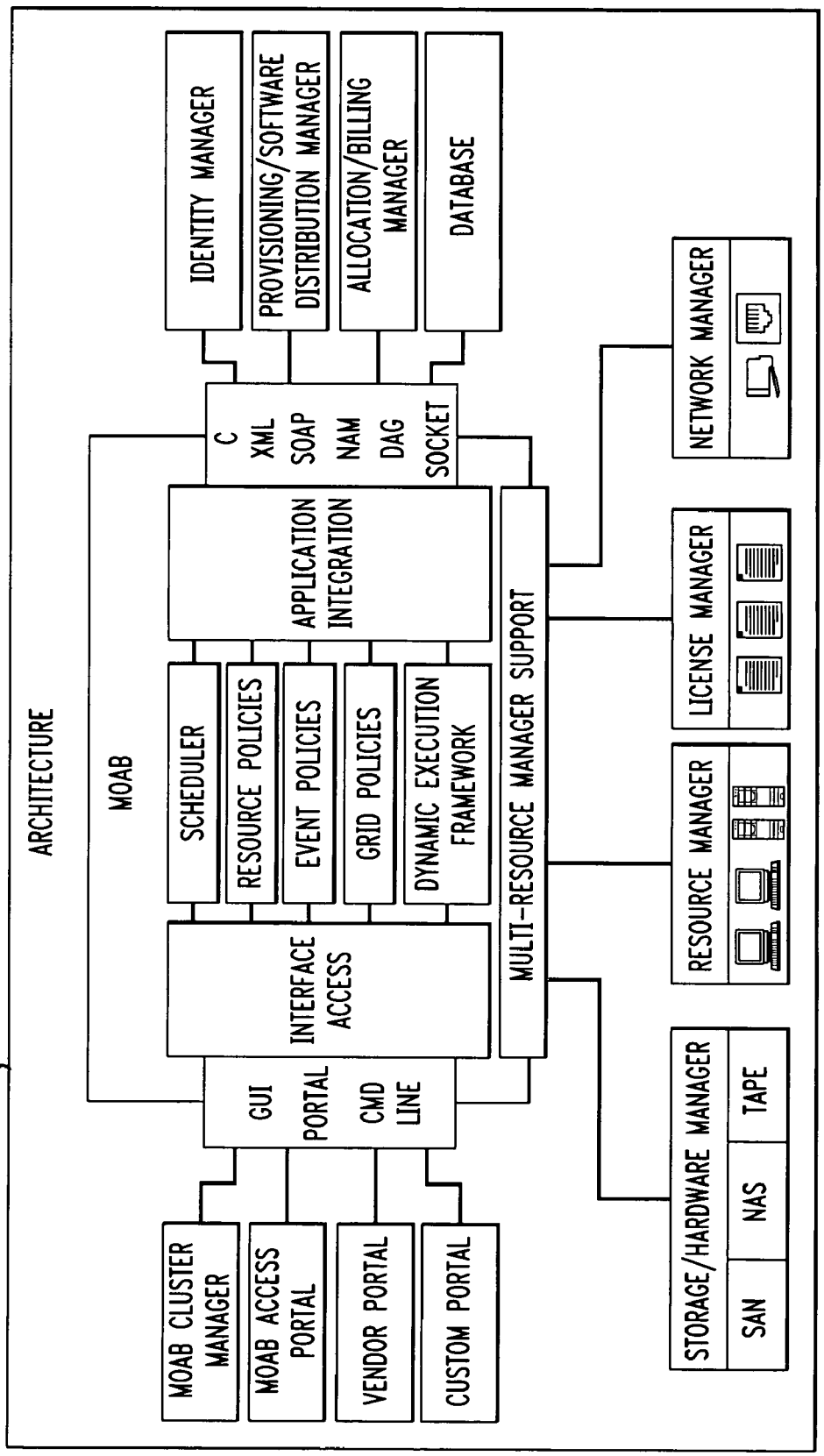
FIG. 8 illustrates an architectural overview of cluster management software.

FIG. 8 illustrates generally a window 800 showing a product architecture overview of a cluster management software suite and how all the products interact with a workload manager. Users can click on products and installation/setup information is displayed. Those of skill in the art will understand the various components shown here by way of example.

Figure 9:
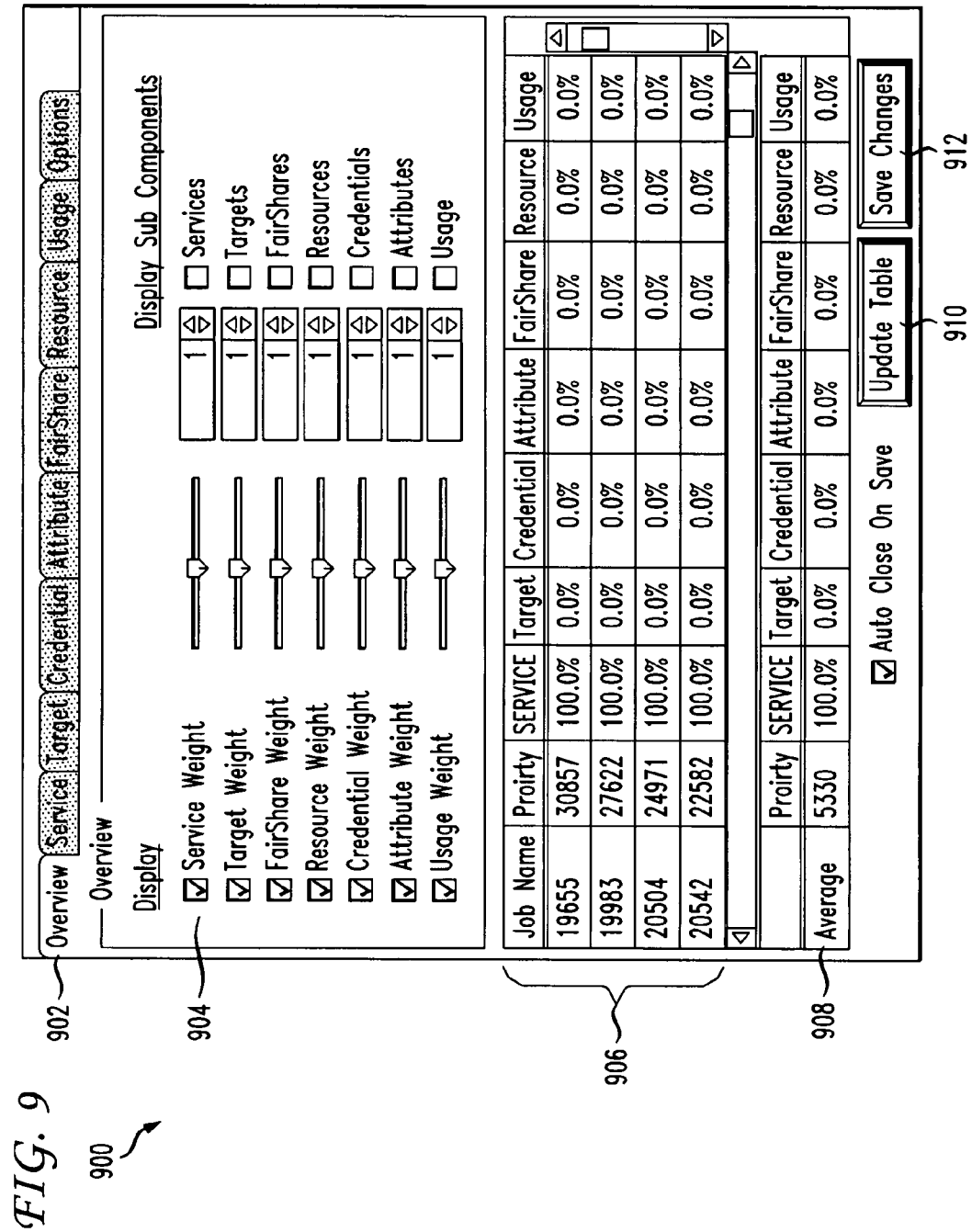
FIG. 9 illustrates a graphical user interface for providing priority configuration information.

FIG. 9 illustrates an interface 900 that enables the user to manipulate and manage priority configurations. Window 900 allows administrators of a cluster or grid or compute farm to prioritize the entire system any way, shape, or form. This aspect of the interfaces gives the administrators power to customize the workload manager according to their needs. Tabs 902 enable the user to utilize an overview, service, target, credential, attribute, fairshare, resource, usage and option interfaces. Within window 904, the user can vary the weights of parameters such as service, resources, credentials, usage, target, attribute and so forth. With the horizontal graphical bars in pane 904, the user can graphically adjust these parameters The data at the bottom of FIG. 9 illustrate job names, priorities, and then percentages associated with each job. This shows 100% service and 0% for the other types of parameters in data 906. Data 908 includes an average for the parameters in 906. An update table 910 and save changes 912 options give the administrator more flexibility in updating and saving the data.

Figure 10:
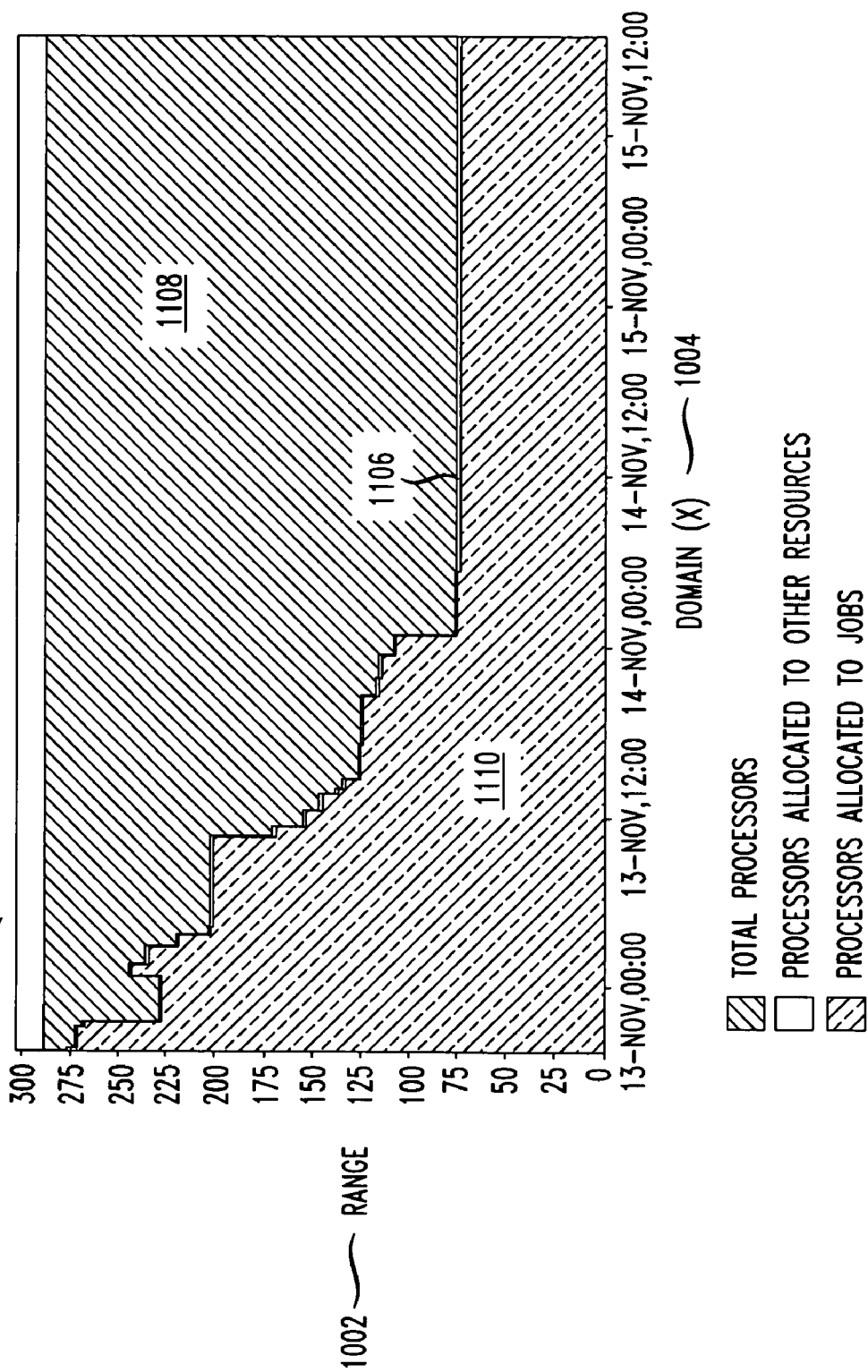
FIG. 10 illustrates a processor usage overview interface.

FIG. 10 illustrates a processor usage overview 1000. This interface displays the processors to be consumed by reservations in the future. This interface helps a user know when he or she can reserve compute resources according to a section of time. Here, the white space 1008 represents unreserved and unused resources; the filled-in space 1110 represents processors allocated to jobs. There is a thin line 1006 between these two spaces that represents processors allocated to other resources. The Y axis 1002 represents processors (but can be any other compute environment parameter or a combination of parameters) and the X axis 1004 represents time.

This processor usage may also be coupled with the reservations graph below as shall be discussed with reference to FIG. 12.

Figure 11:
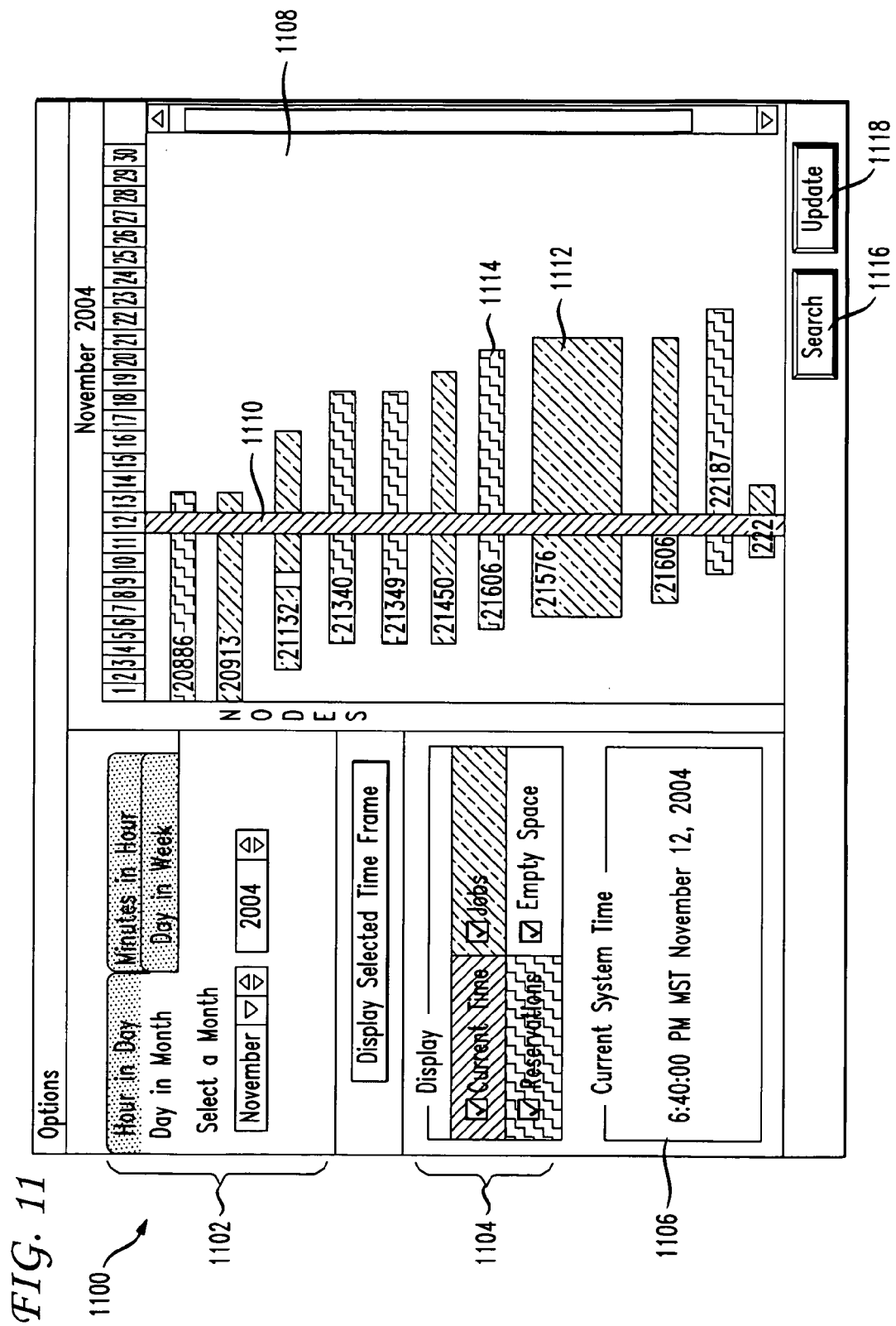
FIG. 11 illustrates a reservation graph overview.

FIG. 11 illustrates a display 1100 of reservations across time. The line 1110 is the current time and the other lines 1114 and 1112 are jobs and reservations. Days in the month are represented across the top of window 1100 and the left side represents processors used by the reservations. The purpose of this graphical interface is to allow reservations to be visually seen and modified. Window 1100 illustrates an example where current time, reservations, jobs and empty space are selected in pane 1104. These are color coded. The current time 1110, jobs 1112, reservations 1114 and empty space 1108 are checked and thus shown on the window 1100. The empty space may or may not represent real unused or unreserved resources. Windows 1102 show the time/date information and current system time 1106. Search 1116 and update 1118 buttons are also available.

One aspect of the invention comprises using the reservation graph of FIG. 11 with the view of the processor usage graph next to it. Then the user may be able to click on a reservation 1114 from the reservation graph and either drag it or have it appear in the processor usage graph (see FIG. 10). Then the user can identify graphically how the reservation would affect resources and how the reservation can be altered graphically. For example, the user may be able to increase the number of processors to continue with the reservation. The user may be able to decrease or increase the time of the reservation. Typically, the rectangles (or any other shape) left of the current time 1110 represents consumed resources and the graphical representation on the right of the current time 1110 represents reserved resources reserved to complete the job. These graphical representation of reserved and consumed resources may be color coded or shaped coded in order to further present information about their usage and efficiency. Utilizing this graphical interface 1100, a user can modify a reservation graphically part way through processing a job.

Another aspect of the invention involves when the user imports a reservation/job into the processor usage graph, the graph morphs in such a way as to accommodate the reservation in the graph. For example, the processor usage would go down in the graph because the reservation/job would include some processor consumption and processor reservation. In this manner, the user can get a true and current view of processor usage in the past and how the reservation for the remainder of the job may be altered in view of real available resources.

Another aspect of this invention is that if the reservation is made according to a certain cost, and the user desires to finish the reservation sooner, in this graphical representation, the user/administrator may increase the resources in the reservation graphically, and the system may automatically alter at least one other parameter, such as the ending time, according to the policies or other parameters. For example, if the user has 1 hour left on the reservation of 4 processors, the user may be able to graphically view that if he/she increases the number of processors to 8, then the time parameters automatically is shown to change to show that the job can finish in ½ hour. There may be options to increase the cost and charge the user more for modifications and so forth. There may also be options according to required and guaranteed qualities of service versus preferred qualities of service. For example, if the alteration and reduction in finishing time is reduced from 1 hour to ½ hour, that may meet a preferred criteria but cost the user more money accordingly. A dialog would ensue which would inform the user and receive confirmation of the change in the reservation.

After the user graphically manipulates the reservation in the processor graph, then the reservation would preferably return, as modified, to the reservations graph. This invention allows for dynamic and graphical alteration and manipulation of reservations of compute resources in a powerful way.

As user makes an alteration, the alteration may be viewed as a request for a reservation in which the system will return statistics and probabilities of accomplishing that change in the compute resources, reprovisioning and other modifications to the compute environment may be necessary to accomplish a reservation with guarantees and those would be presented to the user for confirmation before a change in the reservation is committed.

Once a modified reservation would be committed and returned from the processor graph to the reservations graph, the processor graph would then preferable incorporate the changes in the reservation and illustrate graphically the unused/unreserved resources and reserved resources, with resources used for non-job processes, accordingly.

In the case with the above screen shots as well as all disclosed herein, one can right-click or perform some other action and receive further information about a job, reservation, white space (unused/unreserved resources) and so forth.

FIG. 12 illustrates some of the capabilities introduced above. Within graph 1200 there are consumed resources 1210, reserved resources 1212 and the current time 1216. A user drops in a reservation/job 1202 that may include both a consume portion 1208 in the past and a port representing reserved resources 1206 to complete the job. The user may be able via a mouse click or some other user interactive means to modify the reservation 1204 to increase or decrease any parameter. What is shown here is an increase in the number of processors and a decrease in the amount of time until the end of the reservation. As mentioned, any two parameters may be tied together where if the user modifies in one direction the other parameter is graphically altered according to a criteria such as available resources or a policy etc.

When the reservation/job 1202 is dropped into the graph 1200, the amount of consumed resources 1210 and reserved resources 1212 may be automatically altered to reflect that the job/reservation 1202 is shown. For example, the consumed resources 1210 may reduce by the amount of consumed resources 1208 of the job. Similarly, the reserved resources 1212 may be altered according to the reserved resources 1206 that were dropped into the graph 1200. In this manner, the user may get an accurate view of unreserved resources 1214 and consumed and unconsumed resources 1218.

The user may also use graph 1200 to simply graphically create a reservation 1220. Whenever a reservation is altered or created, it is typically treated as a request for a reservation and an analysis is done on whether a reservation that meets appropriate criteria as well as available resources is made. The graphical presentation as shown enables the user to instantly know what resources are available. Therefore, there may be a dialog with the user to confirm that a reservation will be created or given that the user already may know that the available resources exist, then the reservation may be directly made. The shape of the reservation (number of processors/resources, the time and so forth) may be automatically bound according to the particular user's credentials. In other words, the user may be limited to 16 processors for one hour, and as that user attempts to graphically create a reservation, the size of the reservation will be kept within the user's allowed boundaries, as well as the user's allowed starting time. For example, a user may be allowed to start jobs only after 2 hours. In this case, then the user could not create a reservation that would start within 1 hour graphically but would be automatically limited to start times of at least two hours. Box 1204 may illustrate another option of a user attempting to create a reservation. Therefore, as can be appreciated, all the administrative and available resource data underlies and has bearing the graphical interface.

The following description provides additional information and insight into the visual cluster overview and visual reservations creation and modification discussed above. Nodes may be selected by <ctrl>-click, by drag, or by specifying criteria, and clicking on criteria value, i.e. specify criteria=network, click on ethernet, and all ethernet nodes are selected, etc. Other means as well such as through touch sensitive screens or motion detection may be used to select a visual node. Where one or more nodes have been selected, one option is that by right clicking on selected group, the user may select to modify a mode or option such as, for example, to establish the node as online or offline or a popup or query node. The user may modify or provision the node or reserve the node. As can be appreciated, there are many types of functionality that may graphically initiate or modify by the graphical interfaces disclosed herein.

With reference again to at least FIG. 11, a visual/graphical reservation (reservation centric approach) ability may include the reservations shown 1114, 1112. Functionality that is part of this invention includes the capability of selecting (via a double click, for example) a reservation that brings up a pop-up reservation window for making or modifying the reservation. Another option is that the user may right-click or identify in some other fashion a reservation. The menu includes options to at least: cancel, popup/query, modify attributes, modify a timeframe associated with the reservation and modify an allocation or resources associated with the reservation.

Reservations may be dragged to new location with a color-coding to help the user understand and easily manage the reservations. For example, green may be associated with an "OK" and red indicating a failure. Therefore, colors or some other means may be employed to notify the user that the reservation modification is acceptable. For example, if a proposed modification to a reservation is not acceptable, the original location of the reservation shown in FIG. 11 may be maintained. Options presented to the user may include showing a shadow of the original location as the user explores modifications of the reservation, and a "restore to original" option for undoing the modification or in some manner stop the modification (either mid-stream or after committing the modification).

Underlying the graphical user interface is a graphical management module such as, for example, the gmoab software. The software communicates with the workload manager (such as, for example, Moab) with validate modifications.

Another aspect of how a user may graphically establish or modify a reservation is if a right click 'modify timeframe/allocation' is selected, a popup reservation timeframe window with reservation 'subtracted' from reported resource usage is presented to the user and displayed in available whitespace. Resources displayed vertically only incorporate resources which satisfy a reservation request, i.e. state, memory, feature, nodes, etc. Other resources may be shown but 'greyed' out. An example of the greyed our resources as shown in FIG. 12, feature 1222 wherein these resources are presented in a different color or some other scheme in which these resources are differentiated from the other resources that used and/or reserved.

This graphical interface provides drag extension to anywhere in white space 1214 to modify start time, end time, duration, resource allocation quantity or other parameters. The interface provides sliders, text boxes or other modification capabilities to direct the specification of start, end, duration, quantity, etc. parameters. The interface also provides a resource constraint box (not shown) to enable/disable resource constraints including hostlist, memory, disk, network, feature, etc.

The inventors note that the visual reservation capability of this graphical user interface includes the availability of using the system for modification of existing reservation and creation of new reservations.

Figure 13A:
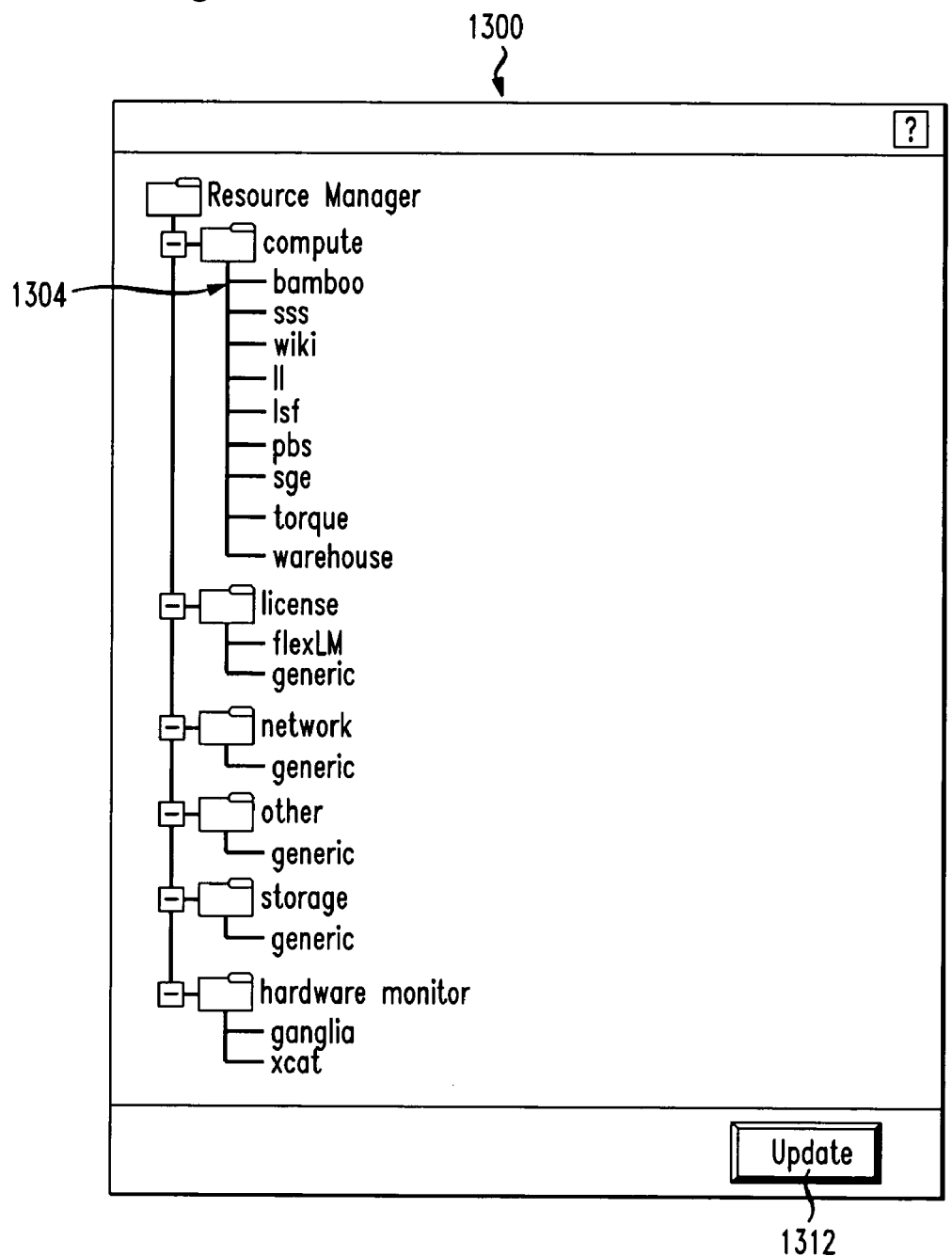
FIG. 13 illustrates an interface enabling resource manager browseable resources.
Figure 13B:
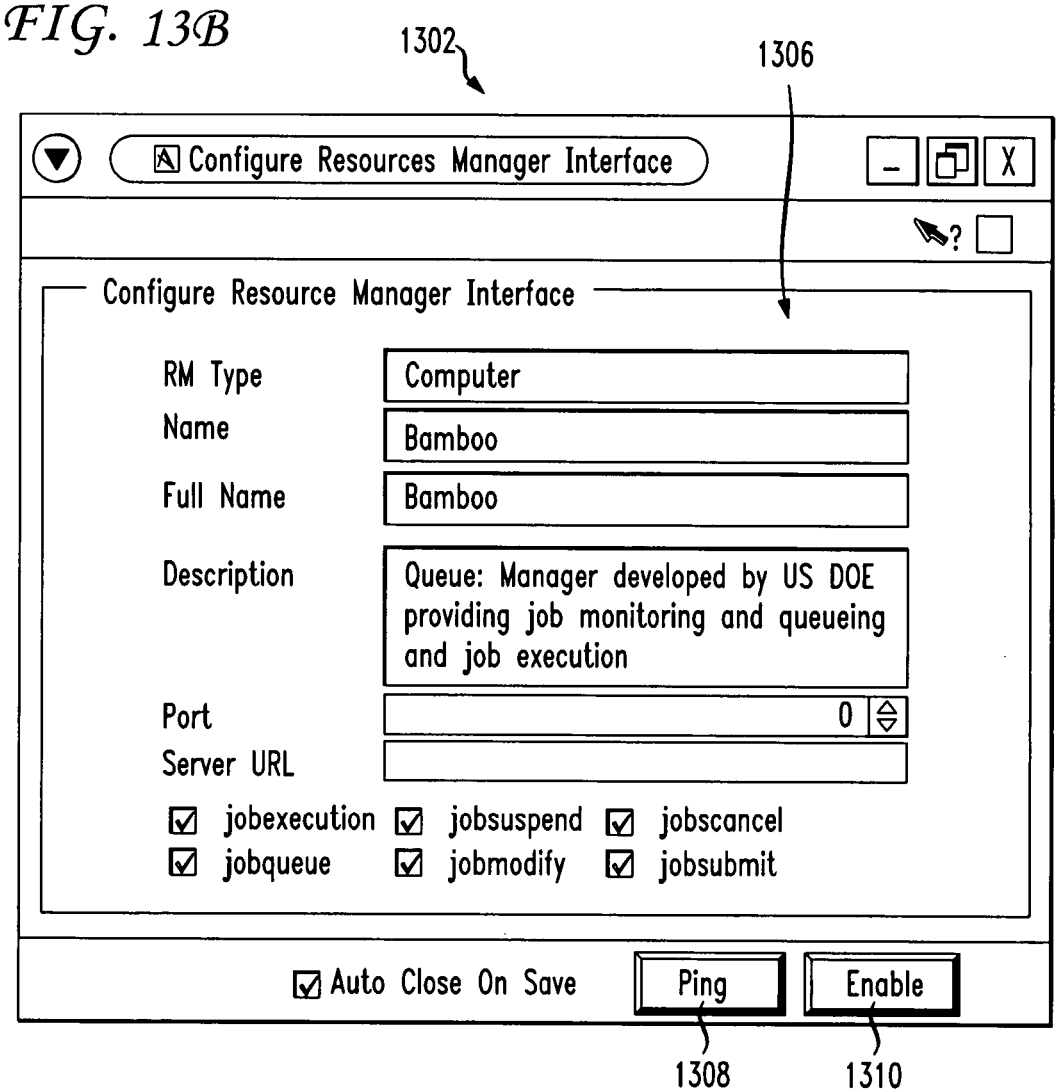

FIG. 13 illustrates a resource manager browseable window for resources. FIG. 13 shows a window 1300 and window 1302 that illustrate graphically the interface of resource managers with a workload manager such as Moab. Window 1300 includes resource managers compute, license, network, other and other features. Of the compute resource managers, the "bamboo" manager is highlighted 1304. Window 1302 shows information associated with the bamboo environment resource manager. Within the window 1306 there are features such as the name of the resource manager, its type, a description of the resource manager, and check boxes for various features such as jobexectuion, job requeue, job suspend, jobmodify, jobcancel, and jobsubmit. Window 1300 further includes a breakdown of the resource managers based on type that can interface with the workload manager. By clicking on the resource manager 1304, a window pops up 1302 wherein one can customize settings and enable the resource manager. Buttons ping 1308 and enable 1310 provide the user with options to process the request.

Figure 14:
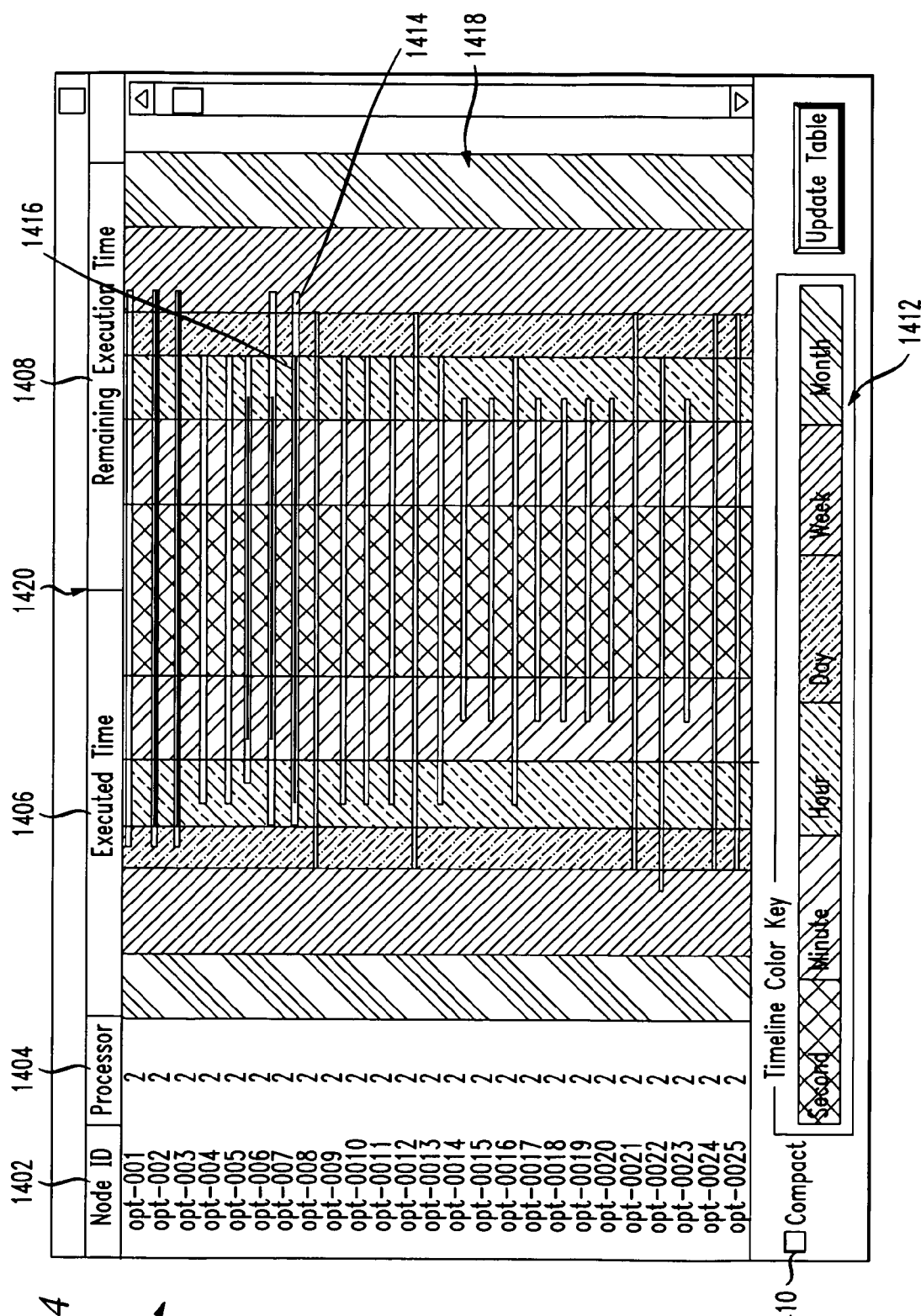
FIG. 14 illustrates a node timeline for compute resources.

FIG. 14 illustrates another aspect of the graphical user interface of the workload manager. Window 1400 includes columns for a nodeID 1402, processor information 1404, an executed time portion 1406 and a remaining executed time 1408 portion. A current time may be shown at point 1420. Jobs 1416 and reservations 1414 are shown on a horizontal configuration but the axis may be in any direction. The jobs 1416 and reservations 1414 are shown as having a portion that have been executed on a node basis and a portion that reflects the remaining execution time. A compact button 1410 enables the user to change the visual presentation. A timeline color key 1412 presents in different colors or in some other visual queues seconds, minutes, hours, days and weeks. These different color queues are presented in the background 1418 to enable the user to visually observe where jobs and reservations are running.

Figure 15:
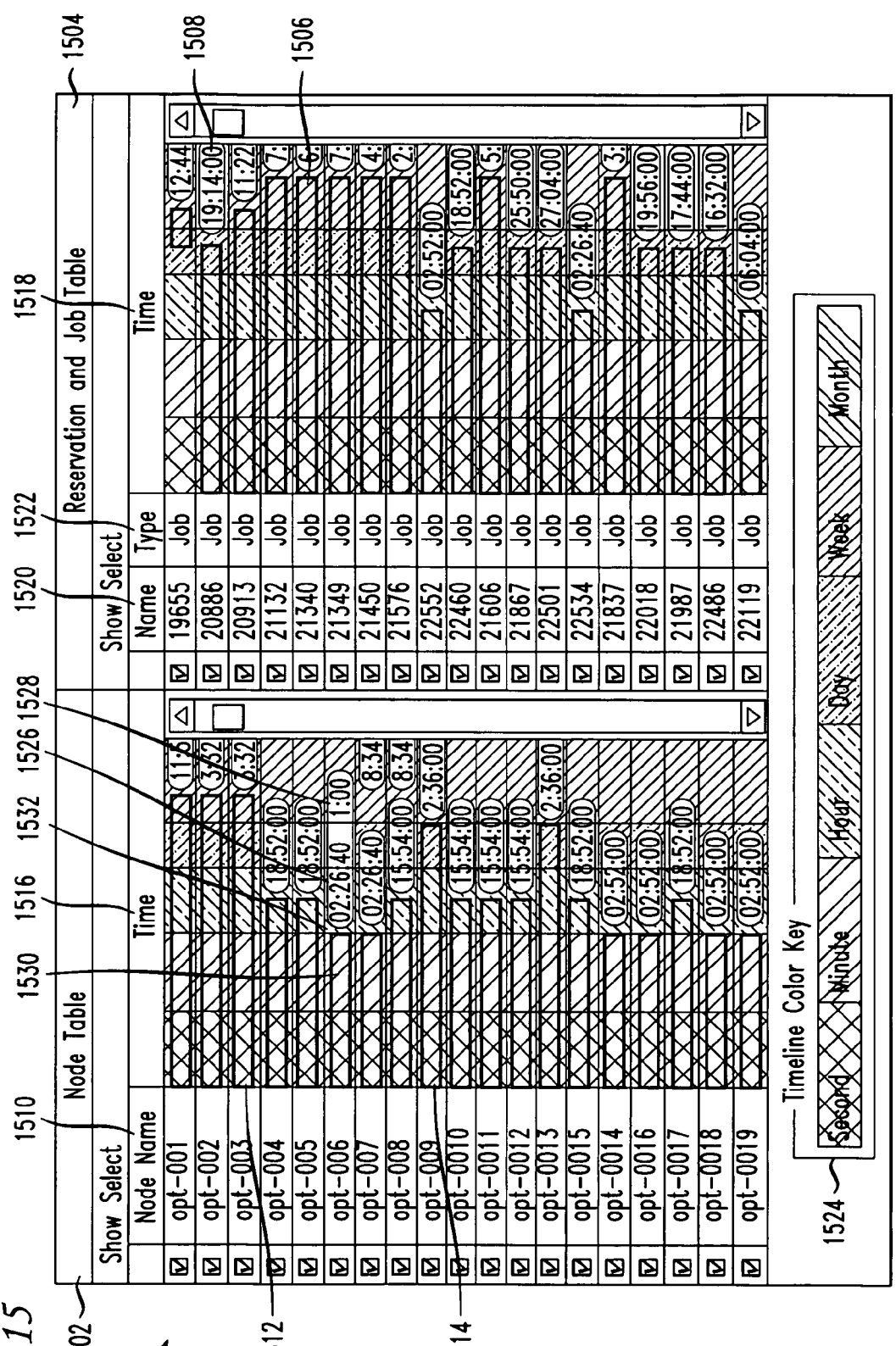
FIG. 15 illustrates a visual node interface.

FIG. 15 illustrates another window 1500 which presents to the user the status of jobs and reservations on nodes. The left side of the image 1502 includes a column for node names 1510 and a column for time 1516. The portion of window 1500 includes graphical presentations of a reservation 1532, 1514 and jobs 1530, 1512. Times 1526, 1528 are shown for one of jobs or reservations. The right-hand portion 1504 of window 1500 presents a column for a reservation/job column name 1520, a type column 1522 and a time column 1518. The job or reservation 1506 is included as well as times 1508. A timeline color key 1524 shows how the color behind the bar charts corresponds to how long the job or reservation will run. This window 1500 and the information it presents enables a user to better understand reservations and where they are running.

FIG. 16 illustrates a charging and credit window 1600 that provides for invoicing crediting used on the system. A workload manager such as Moab may give credits to a user and then deduct them according to a different matrix. Job execution, time on a cluster, and other factors may be used to bill a user's credit account. The system automatically generates invoices based on all usage. This enables the system to charge customers and track usage of the compute resources.

Figure 17:
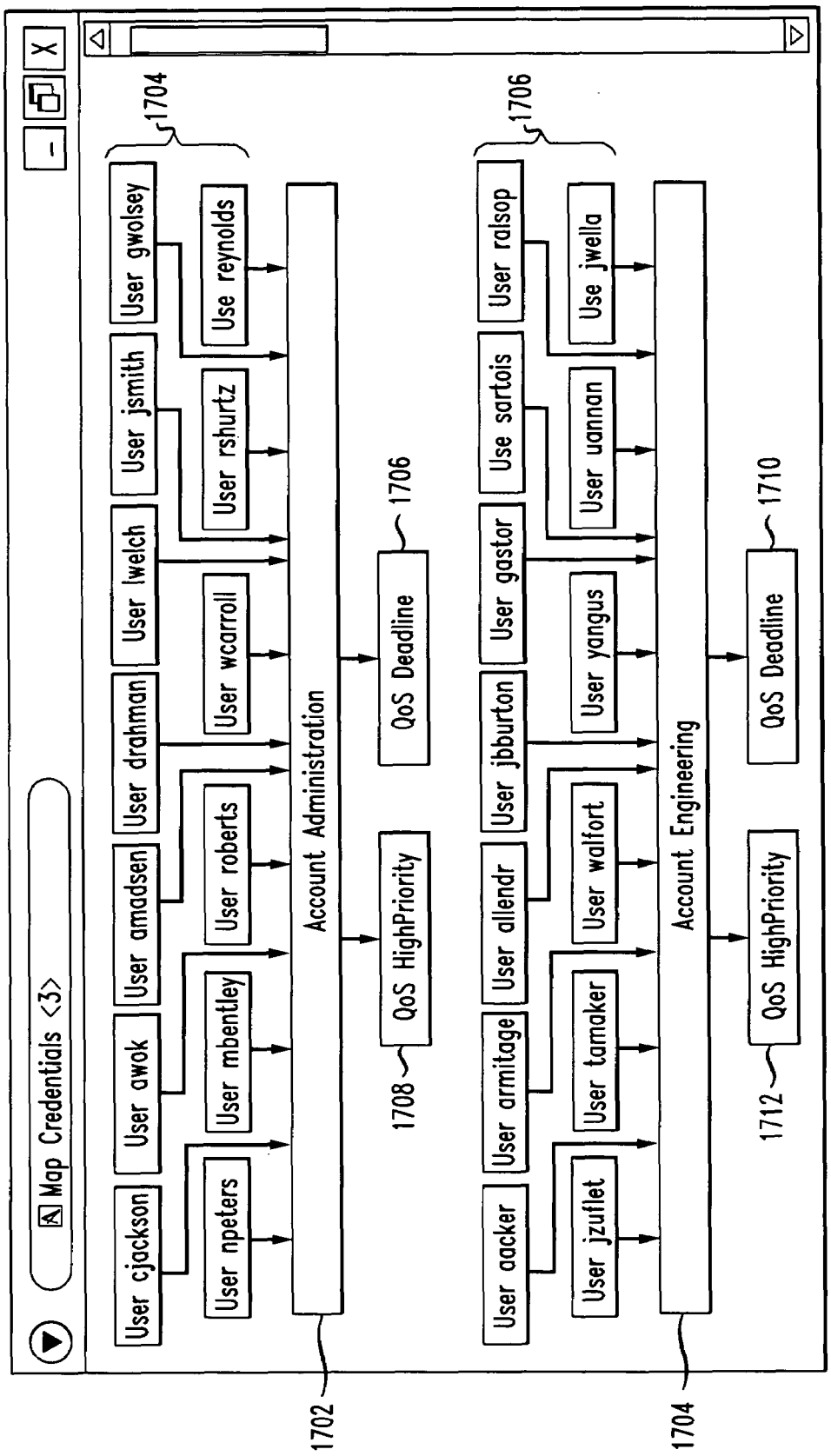
FIG. 17 illustrates a visual dynamic credential interface.

FIG. 17 illustrates a visual dynamic credentials window 1700. This window is used to present a visual breakdown of user and/or group credentials on a system. The visual breakdown of the credentials on the system is presented in window 1700. The arrows point to where that credential has access. The purpose is visually to create credentials and give them access. This aspect of the invention allows one to graphically create credentials and give access to individuals or groups. For example, an account administrator can receive credential information from all the identified users and administer QOS high priorities and QOS deadlines. There are dependencies identified graphically between users 1714, 1716, administrators 1702, 1704 and usage criteria 1706, 1708, 1710, 1712 that are organized and presented graphically for ease of manipulation and creation. The one-way arrows indicate who has authority and where the dependencies are. Two-way arrows may also indicate reciprocal dependencies.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

I claim:

1. A tangible computer-readable storage medium storing instructions for implementing a graphical user interface for managing compute resources within a compute environment, the graphical user interface comprising:
   a presentation of a window having a plurality of nodes on a first axis and a time frame on a second axis; and
   a presentation of selectable options within the window, the selectable options including at least current time, reservations, jobs and empty space, wherein the window presents consumed compute resources in a past time and user-selected options in a future time.

2. The tangible computer-readable storage medium of claim 1, wherein if a user selects jobs for display, the interface presents in the future time reserved resources to allow jobs to process.

3. The tangible computer-readable storage medium of claim 1, wherein if a user selects reservations for display, the interface presents in the future time reserved resources.

4. The tangible computer-readable storage medium of claim 1, wherein if a user selects empty space for display, the interface presents empty space with a visual queue that represents at least one of unused and unreserved resources.

5. The tangible computer-readable storage medium of claim 1, wherein different visual queues are presented for different display options.

6. The tangible computer-readable storage medium of claim 1, wherein the time value presents options modifiable by a user.

7. The tangible computer-readable storage medium of claim 1, the graphical user interface further comprising:
a module configured to receive from a user a request for a reservation utilizing empty space within the window.

8. The tangible computer-readable storage medium of claim 7, wherein the module configured to receive a request for a reservation further receives a drag and drop operation from the user.

9. The tangible computer-readable storage medium of claim 7, wherein the module configured to receive a request for a reservation further receives a right-click operation from the user.

10. The tangible computer-readable storage medium of claim 1, further comprising a module configured to receive and modify a presented reservation while an associated job is being processed.

11. The tangible computer-readable storage medium of claim 1, further comprising a module configured to receive a selection of a presented feature within the window and import the presented feature graphically into a processor usage graphical interface.

12. The tangible computer-readable storage medium of claim 1, further comprising a module configured to receive a selection of a feature by a user and presenting information associated with the selected feature.

13. The tangible computer-readable storage medium of claim 1, wherein upon selection of a reservation by a user, the interface presents at least one of the following options for modification of the reservation; cancel the reservation, query for information about the reservation, modify attributes associated with the reservation, modify a timeframe associated with the reservation and modify an allocation of resources associated with the reservation.

14. The tangible computer-readable storage medium of claim 1, wherein if a reservation is selected and dragged to a new location within the window, the interface presents an indicator of whether the reservation modification is acceptable.

15. The tangible computer-readable storage medium of claim 14, wherein if a reservation is selected and dragged to a new location within the window, the interface presents a shadow of a reservation original location and presents an option to the user to restore the reservation to the original location.

16. The tangible computer-readable storage medium storing instructions for implementing a graphical user interface for managing compute resources within a compute environment, the graphical user interface comprising:
a presentation of a window having resources on a first axis and time on a second axis; and
a presentation of a current time, consumed resources in a past time and reserved resources in a future time;
a presentation of a reservation selected by a user for modification within available resource space; and
a module configured to receive modifications of the reservation from the user and to present changes to the resources in the future time according to the modifications.

17. The tangible computer-readable storage medium of claim 16, wherein the selected reservation is subtracted from reported resource usage within the window.

18. The tangible computer-readable storage medium of claim 16, wherein the window is presented to the user upon the user selecting a reservation from a visual reservations window.

19. The tangible computer-readable storage medium of claim 16, wherein the window only presents resources on the first axis which satisfy the selected reservation.

20. The tangible computer-readable storage medium of claim 19, further comprising presenting with a visual queue other resources on the first axis which are not necessary for satisfying the selected reservation.

21. The tangible computer-readable storage medium of claim 16, further comprising a module configured to dialog with the user to perform one of: confirm creation of the reservation, negotiate a parameter associated with a proposed change in the reservation.

22. The tangible computer-readable storage medium of claim 16, wherein modifications to the reservation may be at least one of: start time, end time, duration and resource allocation quantity.

23. The tangible computer-readable storage medium of claim 16, wherein modifications to the reservation are automatically bounded by user credentials.

24. A system for implementing a graphical user interface for managing compute resources within a compute environment, the system comprising:
a hardware module configured to present a window having a plurality of nodes on a first access and a timeframe on a second axis; and
a hardware module configured to present selectable options within the window, the selectable options including at least current time, reservations, jobs and empty space, wherein the window presents consumed compute resources in a past time and user-selected options in a future time.

25. The system of claim 24, wherein if the system receives a user selection of jobs for display, the interface presents in the future time reserved resources to allow jobs to process.

26. The system of claim 24, wherein if the system receives a user selection of empty space for display, the interface presents empty space with a visual queue that represents at least one of unused and unreserved resources.

27. The system of claim 24, further comprising:
a module configured to receive from a user a request for a reservation utilizing empty space within the window.

28. The system of claim 27, wherein the module configured to receive a request for a reservation further receives a drag and drop operation from the user.

29. The system of claim 24, wherein upon selection of a reservation by a user, the interface presents at least one of the following options for modification of the reservation: cancel the reservation, query for information about the reservation, modify attributes associated with the reservation, modify a timeframe associated with the reservation and modify an allocation of resources associated with the reservation.

30. A method of implementing a graphical user interface for managing compute resources within a compute environment, the method comprising:
presenting a window having a plurality of nodes on a first axis and a timeframe on a second axis; and
presenting selectable options within the window, the selectable options including at least current time, reservations, jobs and empty space, wherein the window presents consumed compute resources in a past time and user-selected options in a future time.

31. The method of claim 30, wherein if a user selects jobs for display, the interface presents in the future time reserved resources to allow jobs to process.

32. The method of claim 30, further comprising:
receiving from a user a request for a reservation utilizing empty space within the window.

33. The method of claim 32, wherein receiving a request for a reservation further receives a drag and drop operation from the user.

34. The method of claim 30, wherein upon selection of a reservation by a user, the method further comprises presenting at least one of the following options for modification of the reservation: cancel the reservation, query for information about the reservation, modify attributes associated with the reservation, modify a timeframe associated with the reservation and modify an allocation of resources associated with the reservation.

* * * * *